(12) United States Patent
Miller et al.

(10) Patent No.: US 11,155,035 B2
(45) Date of Patent: Oct. 26, 2021

(54) METHOD OF PRINTING A CONTOURED OBJECT USING COLOR AND STRUCTURAL LAYERS

(71) Applicant: NIKE, Inc., Beaverton, OR (US)

(72) Inventors: Todd W. Miller, Portland, OR (US); Laurel Manville, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 35 days.

(21) Appl. No.: 16/696,610

(22) Filed: Nov. 26, 2019

(65) Prior Publication Data

US 2020/0094481 A1  Mar. 26, 2020

Related U.S. Application Data

(63) Continuation of application No. 15/609,226, filed on May 31, 2017, now Pat. No. 10,493,697.
(Continued)

(51) Int. Cl.
   *B29C 64/386* (2017.01)
   *B29C 70/74* (2006.01)
   (Continued)

(52) U.S. Cl.
   CPC .......... *B29C 64/386* (2017.08); *B29C 64/112* (2017.08); *B29C 64/393* (2017.08);
   (Continued)

(58) Field of Classification Search
   CPC ..... B29C 64/386; B29C 64/10; B29C 64/112; B29C 64/393; B29C 70/747; B29C 64/00;
   (Continued)

(56) References Cited

U.S. PATENT DOCUMENTS 10,493,697 B2 * 12/2019 Miller .................. B29C 64/112
2003/0179270 A1   9/2003 Yamamoto et al.
(Continued)

FOREIGN PATENT DOCUMENTS

JP   2002-144555   5/2002
JP   2002-192536   7/2002
(Continued)

OTHER PUBLICATIONS

Notification of Reasons for Refusal (w/ English translation) for related JP Application No. 2018-562198, 12 pages, dated Dec. 12, 2019.
(Continued)

*Primary Examiner* — John L Goff, II
(74) *Attorney, Agent, or Firm* — Klarquist Sparkman, LLP

(57) ABSTRACT

A method of printing a three-dimensional color object having a contoured surface onto a substrate includes printing color ink layers and structural ink layers. A color ink layer is printed onto the substrate. Structural ink layers are printed onto the color ink layer to build the three-dimensional shape of the object. The contoured surface is formed from varying the heights of pixel columns in the printing information. The heights of the pixel columns may be varied by printing different numbers of layers in adjacent columns or by printing the same number of layers in adjacent columns where some pixels in a column have different thicknesses than other pixels in the column.

20 Claims, 23 Drawing Sheets

Related U.S. Application Data

(60) Provisional application No. 62/343,766, filed on May 31, 2016.

(51) Int. Cl.

| | | |
|---|---|---|
| *B29C 64/112* | (2017.01) | |
| *B29C 64/393* | (2017.01) | |
| *G05B 19/4099* | (2006.01) | |
| *H04N 1/54* | (2006.01) | |
| *B33Y 10/00* | (2015.01) | |
| *B33Y 50/02* | (2015.01) | |
| *B33Y 80/00* | (2015.01) | |
| *B29L 31/48* | (2006.01) | |
| *B29L 31/50* | (2006.01) | |

(52) U.S. Cl.
CPC ........ *B29C 70/747* (2013.01); *G05B 19/4099* (2013.01); *B29K 2995/0026* (2013.01); *B29L 2031/48* (2013.01); *B29L 2031/505* (2013.01); *B33Y 10/00* (2014.12); *B33Y 50/02* (2014.12); *B33Y 80/00* (2014.12); *G05B 2219/49023* (2013.01); *H04N 1/54* (2013.01)

(58) Field of Classification Search
CPC ......... B29C 64/20; B29C 64/30; B33Y 10/00; B33Y 30/00; B33Y 50/02; B33Y 50/00; B33Y 80/00; B29L 2031/48; B29L 2031/505; B29L 2031/50; G05B 19/4099; G05B 2219/49023; A43B 23/0235; A43B 23/024; A43B 23/026

See application file for complete search history.

(56) References Cited

U.S. PATENT DOCUMENTS

| | | |
|---|---|---|
| 2004/0183796 A1 | 9/2004 | Velde et al. |
| 2005/0072113 A1* | 4/2005 | Collins .................. B29C 64/40 52/782.1 |
| 2010/0195122 A1 | 8/2010 | Kritchman |
| 2010/0295881 A1 | 11/2010 | Yao et al. |
| 2013/0241114 A1* | 9/2013 | Ravich .................. B33Y 10/00 264/401 |
| 2014/0020191 A1 | 1/2014 | Jones et al. |
| 2015/0251412 A1 | 9/2015 | Hatanaka |
| 2015/0268393 A1 | 9/2015 | Liles et al. |
| 2015/0269290 A1 | 9/2015 | Nelaturi et al. |
| 2016/0001505 A1 | 1/2016 | Hakkaku et al. |
| 2016/0236416 A1 | 8/2016 | Bheda et al. |
| 2016/0325502 A1* | 11/2016 | Lu ......................... B29C 64/112 |
| 2017/0341305 A1 | 11/2017 | Miller et al. |

FOREIGN PATENT DOCUMENTS

| | | |
|---|---|---|
| JP | 2015-168186 | 9/2015 |
| KR | 2020090012964 | 12/2009 |
| WO | WO 2015/138657 | 9/2015 |

OTHER PUBLICATIONS

Office Action (with an English translation) for related Korean Application No. 10-2018-7036861, 17 pages, dated May 28, 2020.
International Search Report and Written Opinion for related International Application No. PCT/US2017/035135, dated Aug. 7, 2017, 10 pages.

* cited by examiner

METHOD OF PRINTING A CONTOURED OBJECT USING COLOR AND STRUCTURAL LAYERS

CROSS-REFERENCE TO RELATED APPLICATIONS

This application is a continuation of U.S. patent application Ser. No. 15/609,226 filed May 31, 2017, now U.S. Pat. No. 10,493,697, which claims the benefit of U.S. Provisional Patent Application No. 62/343,766 filed May 31, 2016, which are incorporated herein by reference in their entirety.

BACKGROUND

Embodiments relate generally to printing UV-curable graphic layers on bases such as the fabric used to make articles of apparel such as shirts, shorts, pants, jackets, hats or caps, or to make uppers for articles of footwear, such as running, training, jogging, hiking, walking, volleyball, handball, tennis, lacrosse, basketball shoes, and other similar articles of footwear, as well as to make other articles such as backpacks or tents.

Articles of apparel may be made of a woven or nonwoven fabric, or of a mesh material, or may be made of leather, synthetic leather, or of plastic materials. Articles of apparel may have items such as emblems or logos on the sleeves, torso, pants leg, or other portions of the article of apparel. Articles of apparel may also have abrasion-resistant, water-resistant or protective layers at, for example, the elbows, the shoulders, and/or the knees.

Printers or plotters may be programmed to deposit layers of acrylic resin ink, polyurethane ink, TPU ink or silicone ink or other inks on a fabric or other article. Such printers or plotters may be programmed to cover a two-dimensional portion of a fabric, for example, by moving a printhead along a track in a first direction and moving the track in a second direction that is orthogonal to the first direction. Other printers or plotters may move the printhead in a first direction while moving the printer platform in a second direction that is orthogonal to the first direction, or may move the platform in both directions while keeping the printhead stationary.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

For clarity, the detailed descriptions herein describe certain exemplary embodiments, but the disclosure in this application may be applied to any method for fabricating an article including any suitable combination of features described herein and recited in the claims. In particular, although the following detailed description describes certain exemplary embodiments, it should be understood that other embodiments may be used for the fabrication of other articles of footwear or apparel.

As used herein, the terms "printing device," "printer," "plotter," "3D printer," "three-dimensional printing system," or "3D printing system" may refer to any type of system that can print multiple layers onto a fabric, an article of footwear, an article of apparel or other article, including, for example, sign and graphics printers. The printers may use any appropriate type of UV-curable ink, including acrylic resin ink, polyurethane ink, TPU ink or silicone ink or any other appropriate ink.

Other systems, methods, features, and advantages of the embodiments will be, or will become, apparent to one of ordinary skill in the art upon examination of the following figures and detailed description. It is intended that all such additional systems, methods, features, and advantages be included within this description and this summary be within the scope of the embodiments.

Although the drawings and the textual description herein only describe embodiments as they may be used on certain articles of footwear or certain articles of apparel, the descriptions herein may also be applied to other articles of footwear and/or to other articles of apparel, including, for example, articles of footwear such as running, training, jogging, hiking, walking, volleyball, handball, tennis, lacrosse, basketball shoes and other similar articles of footwear, or articles of apparel such as shorts, shirts, jerseys, jackets, pants, gloves, wrist bands, headbands, armbands, hats or caps, as well as to other articles such as backpacks or tents.

Figure 1:
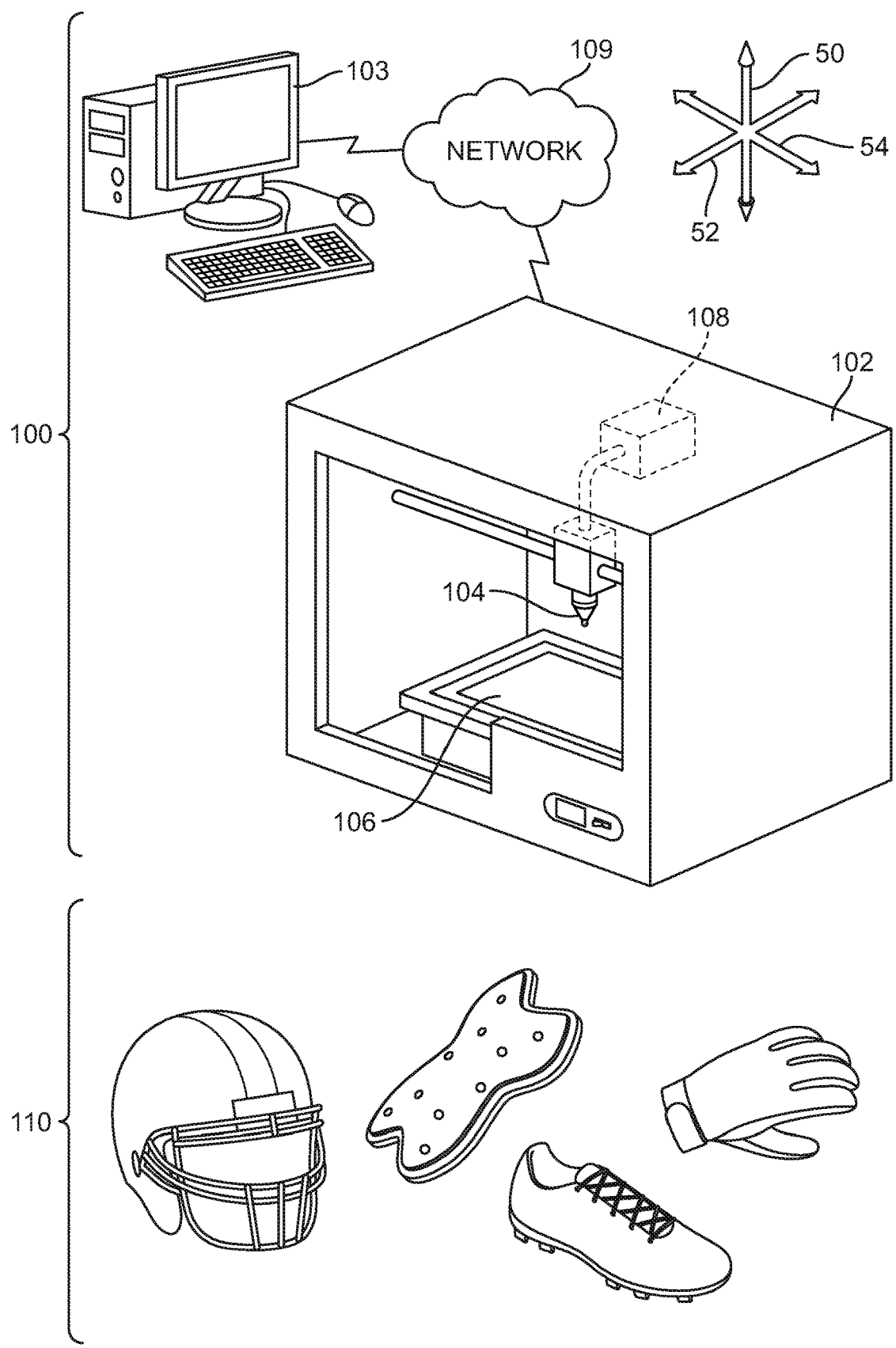
FIG. 1 shows an embodiment of a printing system configured to print three-dimensional colored and contoured objects and various types of articles onto which the three-dimensional colored and contoured objects can be printed.

FIG. 1 is a schematic view of an embodiment of three-dimensional printing system 100, also referred to simply as printing system 100. Some embodiments of the printing system can include provisions that distribute one or more functions among different devices of the printing system. As shown, printing system 100 may include printing device 102, computing system 103, and network 109. In other embodiments, the printing system may be a single device or component (not shown). Such printing systems are further described in co-owned U.S. Provisional Patent Application No. 62/343,757, filed May 31, 2016, and related U.S. Non-Provisional patent application Ser. No. 15/609,205, filed May 31, 2017, both titled "Gradient Printing a Three-Dimensional Structural Component", and co-owned U.S. Provisional Patent Application No. 62/343,686, filed May 31, 2016, and related U.S. Non-Provisional patent application Ser. No. 15/609,220, filed May 31, 2017, both titled "Method and Apparatus for Printing Three-Dimensional Structures with Image Information," all of which are incorporated by reference herein in their entireties.

Some embodiments of the printing device can include provisions that permit color printing. In some embodiments, the printing system may use CMYK printing. In other embodiments, the color printing may be conducted using another suitable printing method. In embodiments where color printing is conducted using CMYK printing, any suitable device, protocol, standard, and method may be used to facilitate the color printing. As used herein, "CMYK" may refer to four pigments used in color printing: "C" for a cyan pigment, "M" for a magenta pigment, "Y" for a yellow pigment, and "K" for a key pigment. In some cases, the key pigment may be a black pigment. An example of a printing device using CMYK printing is disclosed in Miller, U.S. Patent Publication Number 2015-0002567, published on Jan. 1, 2015, titled "Additive Color Printing", which application is herein incorporated by reference and referred to hereafter as the "Color Printing" application. In some embodiments, printing system 100 can include one or more features of the systems, components, devices, and methods disclosed in the Color Printing application to facilitate color printing. For example, the printing device may be configured to print an image by dispensing droplets of a print material including one or more pigments onto a base. As used herein, droplets may refer to any suitable volume of print material. For example, a droplet may be 1 milliliter of print material. In other embodiments, the printing system may use other systems, components, devices, and methods.

In embodiments where the printing system includes provisions that distribute one or more functions among different devices of the printing system, any suitable division may be used. In some embodiments, printing system 100 can include provisions that control and/or receive information from printing device 102. These provisions can include computing system 103 and network 109. Generally, the term "computing system" refers to the computing resources of a single computer, a portion of the computing resources of a single computer, and/or two or more computers in communication with one another. Any of these resources can be operated by one or more human users. In some embodiments, computing system 103 may include one or more servers. In some embodiments, a print server may be primarily responsible for controlling and/or communicating with printing device 102, while a separate computer (e.g., desktop, laptop, or tablet) may facilitate interactions with a user. Computing system 103 can also include one or more storage devices including, but not limited to, magnetic, optical, magneto-optical, and/or memory, including volatile memory and non-volatile memory.

In some embodiments, any suitable hardware or hardware systems may be used to facilitate provisions that control and/or receive information from printing device 102. In some embodiments, where a computing system is used, computing system 103 may include a central processing device, a viewing interface (e.g., a monitor or screen), input devices (e.g., keyboard and mouse), and software for creating a set of predetermined thicknesses for printing a three-dimensional structural component. As used herein, a set of predetermined thicknesses may include any suitable information to facilitate formation of a three-dimensional structural component to have a shape represented by the set of predetermined thicknesses. Examples of shapes represented by a set of predetermined thicknesses may include cylinder, cone, cube, sphere, and the like. In some instances, the set of predetermined thicknesses may be personalized for a particular customer. In other embodiments, other forms of hardware systems may be used.

Generally, any suitable information may be used to facilitate provisions for software for designing a set of predetermined thicknesses for a three-dimensional structural component. In at least some embodiments, software for designing a set of predetermined thicknesses of a printed structure may include not only information about the geometry of the structure but also information related to the materials required to print various portions of the component. In other embodiments, different information may be used.

Generally any suitable design structure may be used to transform the design into information that can be interpreted by printing device 102 (or a related print server in communication with printing device 102). In some embodiments, printing system 100 may be operated as follows to provide one or more components that have been formed using a three-dimensional printing, or additive process. Computing system 103 may be used to design a structure. This may be accomplished using some type of CAD software or other kind of software. The design may then be transformed into information that can be interpreted by printing device 102 (or a related print server in communication with printing device 102). In some embodiments, the design may be converted to a three-dimensional printable file, such as a stereolithography file (STL file); in other cases, the design may be converted into a different design component.

In some embodiments where the printing system includes provisions that distribute one or more functions among different devices of printing system 100, any suitable protocol, format, and method may be used to facilitate communication among the devices of printing system 100. In some embodiments, these communications are conducted using network 109. In other cases, these communications may be conducted directly between devices of printing system 100.

In some embodiments, the network may use any wired or wireless provisions that facilitate the exchange of information between computing system 103 and printing device 102. In some embodiments, network 109 may further include various components such as network interface controllers, repeaters, hubs, bridges, switches, routers, modems, and firewalls. In some embodiments, network 109 may be a wireless network that facilitates wireless communication between two or more systems, devices, and/or components of printing system 100. Examples of wireless networks include, but are not limited to, wireless personal area networks (including, for example, BLUETOOTH), wireless local area networks (including networks utilizing the IEEE 802.11 WLAN standards), wireless mesh networks, mobile device networks as well as other kinds of wireless networks. In other cases, network 109 could be a wired network including networks whose signals are facilitated by twister pair wires, coaxial cables, and optical fibers. In still other cases, a combination of wired and wireless networks and/or connections could be used.

Some embodiments of the printing system can include provisions that permit printed structures to be printed directly onto one or more articles. The term "articles" is intended to include both articles of footwear (e.g., shoes) and articles of apparel (e.g., shirts, pants, etc.). As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots. As used herein, the terms "article of footwear" and "footwear" also include footwear types that are generally considered to be nonathletic, formal, or decorative, including dress shoes, loafers, sandals, slippers, boat shoes, and work boots.

In some embodiments any suitable material may be used to form the article to facilitate use of the article in printing system 100. In some embodiments, printing device 102 may be capable of printing onto the surfaces of various materials such as a textile, natural fabric, synthetic fabric, knit, woven material, nonwoven material, mesh, leather, synthetic leather, polymer, rubber, and foam, or any combination of them, without the need for a release layer interposed between a base and the bottom of the print material, and without the need for a perfectly or near perfectly flat base surface on which to print.

Referring to FIG. 1, which shows an embodiment including set of articles 110, in other embodiments, different articles may be used. As shown, set of articles 110 includes an article of footwear, a shin guard, an article of apparel, and sports equipment like a helmet. In other embodiments, set of articles 110 may be different. Generally, any suitable surface of the article may be used as a base or substrate to receive the printed three-dimensional objects.

While the disclosed embodiments are described in the context of articles of footwear, various embodiments may further be equally applied to any article of clothing, apparel, or equipment that includes three-dimensional printing. For example, various embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used herein, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, and the like.

Some embodiments of the printing system can include provisions that permit printing directly onto the article, regardless of the size and shape of the article, such as the embodiment shown in FIG. 1. In other cases the three-dimensional structural component is first printed onto a release layer and then transferred onto the article. In other embodiments, such as the embodiment shown in FIG. 19, the three-dimensional structural component is printed onto a component of the article and then assembled into the article.

Printing device 102 may be any type of printing device known in the art. In some embodiments, printing device 102 is an inkjet printer. In some embodiments, printing device 102 may include provisions to print directly onto a three-dimensional article, such as shown in FIG. 1, where a print head 104 is positioned proximate a printing platform 106 that may support and properly position an article for the duration of the printing process. Print head 104 is in fluid communication with an ink source 108. Ink source 108 may contain any or all of the different types of ink discussed above. Ink source 108 may contain any number of different colors of ink and transparent structural inks. Print head 104 may be capable of not only dispensing a specified volume of ink received from ink source 108, but may also include provisions for curing the ink. Such provisions may include a UV lamp, a heat source, or a dryer.

Figure 2:
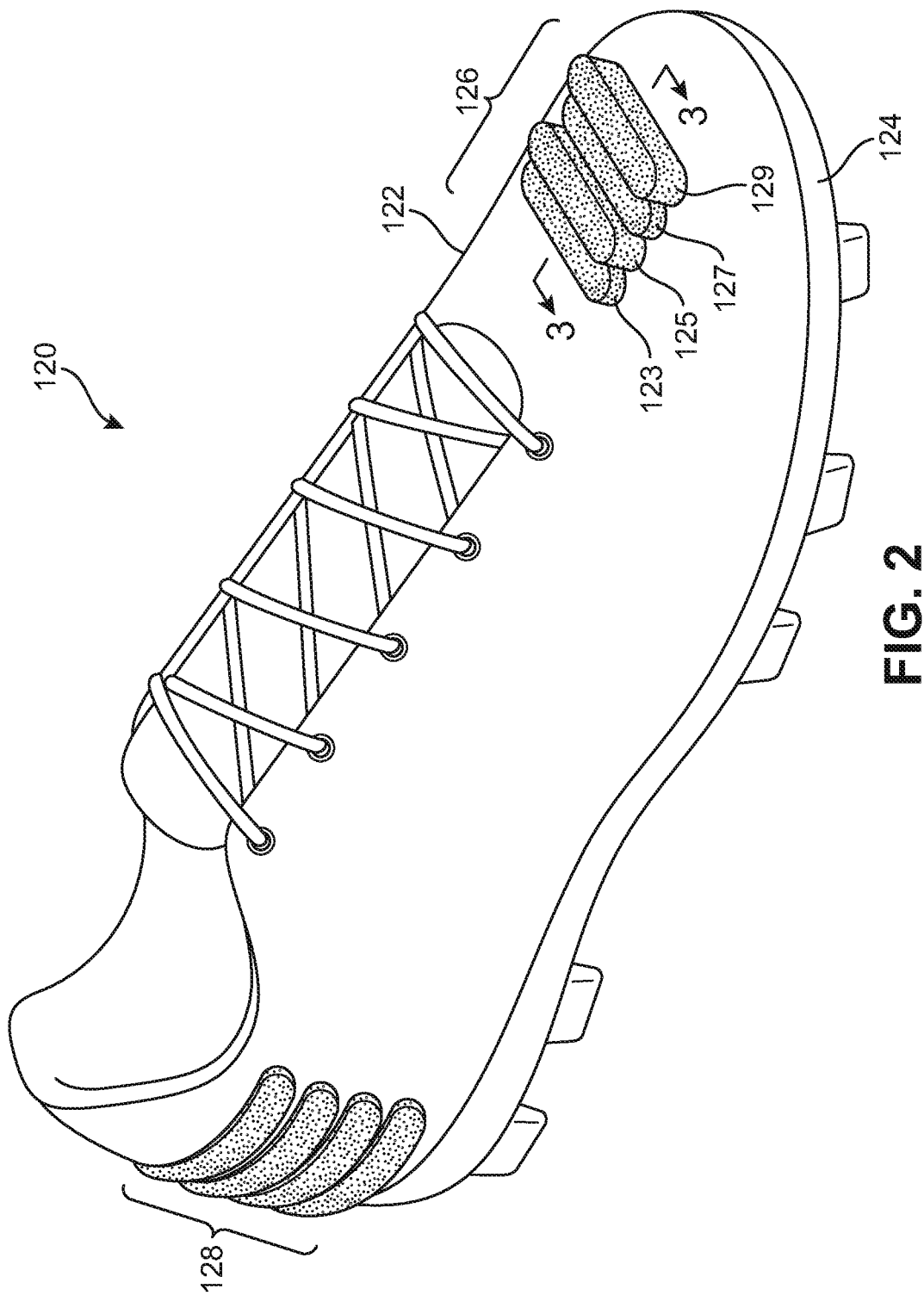
FIG. 2 shows an article of footwear with printed three-dimensional colored and contoured objects printed in a forefoot region and a heel region, where the contoured objects are functional elements.

In some embodiments, such as the embodiment shown in FIG. 2, printing device 102 may be directed to print colored three-dimensional objects onto a surface of the article to form a contoured surface. In some embodiments, such as the embodiment shown in FIG. 2, these contoured surfaces may be primarily functional. In other embodiments, such as the embodiments shown in FIGS. 15 and 16 and discussed further below, these contoured surfaces may be primarily aesthetic.

In some embodiments, the colored three-dimensional objects are formed by printing a color layer directly onto the surface of the article, then building the three-dimensional shape and contours by printing transparent structural ink, and then printing a second color layer on top of the transparent structural ink layers. Sandwiching structural ink layers between color ink layers may improve the appearance of a three-dimensional color printed object. The transparent structural layers allow the color layer that is adjacent the base to be clearly seen, while the color layer printed on top of the transparent structural layers may work with the bottom color layer to provide a unique three-dimensional visual effect. Using transparent ink to build the structure and contours may be more cost-effective than using color ink throughout the structure.

In the embodiment shown in FIG. 2, an article of footwear 120 includes printed functional elements, first functional element 126 and second functional element 128. First functional element 126 is a ball control portion positioned in a forefoot region of article of footwear 120, for use when playing a sport like soccer where precise control of a kicked ball is desirable. Second functional element 128 includes stiffeners positioned in a heel region of article of footwear 120, such as for additional support for the heel cup or as a wear-resistant surface. Both first functional element 126 and second functional element 128 are three-dimensional multi-layer colored objects that include contoured surfaces obtained by printing structural ink onto article of footwear 120. Both first functional element 126 and second functional element 128 may be formed in the same way, however, for simplicity, only first functional element 126 is discussed further below.

Figure 3:
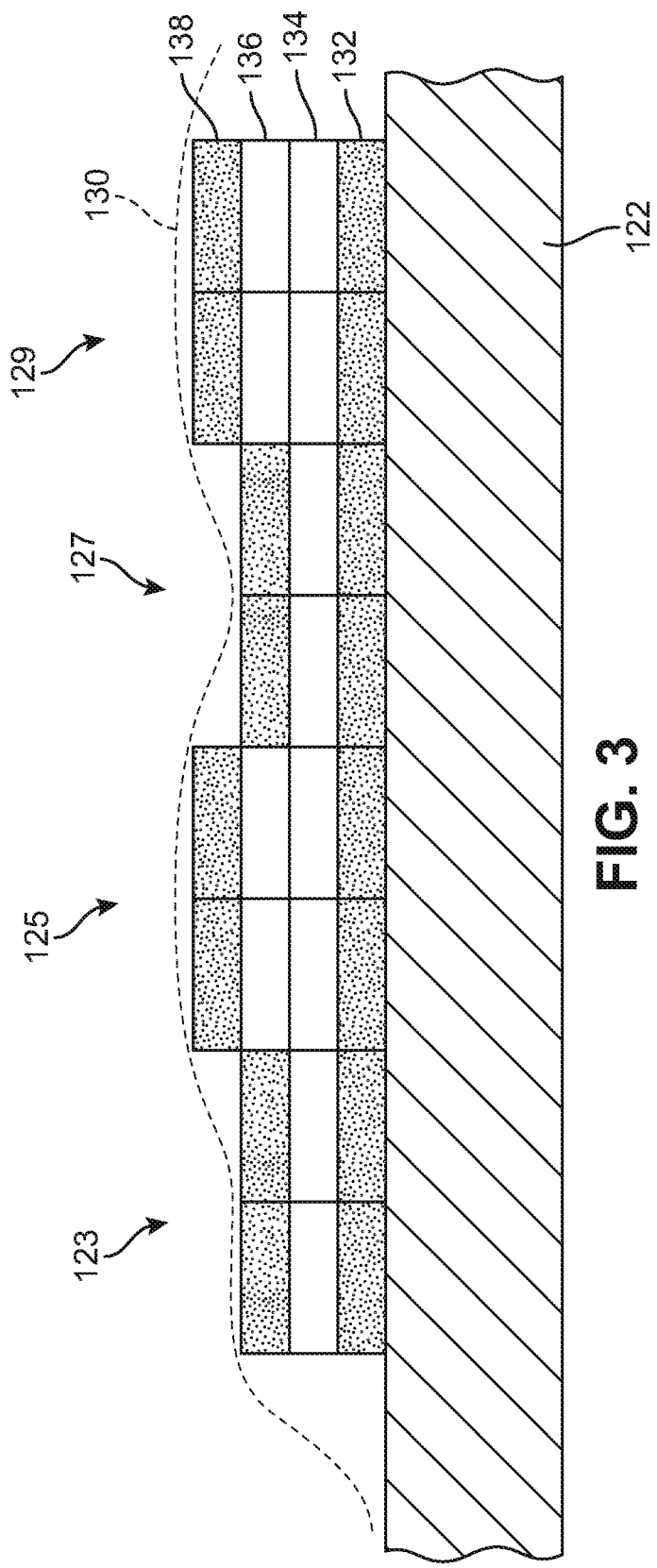
FIG. 3 shows an cross-sectional view of a portion of the article of footwear shown in FIG. 2, where the contoured surface has been formed by varying the heights of columns of ink by printing fewer ink layers in selected columns.

FIG. 3 shows an embodiment of a cross-section of first functional element 126. In this embodiment, first functional element 126 is formed of a plurality of printed layers of uniform thickness. In this embodiment, the plurality of printed layers in first functional element 126 includes a first layer 132, a second layer 134, a third layer 136, and a fourth layer 138, where each layer has a proscribed thickness so that the accumulation of layer thicknesses builds the desired or target thickness of first functional element 126. The layers are printed so that portions of functional element 126 may have different heights and form a contoured surface 130. In this embodiment, contoured surface 130 is formed from a first short raised portion 123, a first tall raised portion 125, a second short raised portion 127, and a second tall raised portion 129 that are positioned adjacent to each other to form a three-dimensional object with contoured surface 130. Contoured surface 130, therefore, has an undulating shape in this embodiment. Because digital printing techniques allow for precise control of the dispensing of ink, first functional element 126 may have any shape and any contoured surface formed of different regions of varying thicknesses.

First functional element 126 is also a colored element. To achieve the desired color and shape of the three-dimensional object, first functional element 126 includes color ink layers and structural ink layers. In some embodiments, the structural ink layers may be colored, while in other embodiments, the structural ink layers may lack a particular color and be transparent, translucent, or clear. In some embodiments, a different type of ink may be provided for the color ink layers and the structural ink layers, while in other embodiments, the color ink layers and the structural ink layers are formed from the same type of ink. In some embodiments, all of the color layers may have the same color or color pattern based upon identical color information. In other embodiments, separate color layers may each have different colors or color patterns using different, unique, or layer-specific color information. In some embodiments, portions of separate color layers may have the same color or color pattern as portions of other color layers, while other portions or regions of the color layers may have different colors or color patterns.

In some embodiments, such as the embodiments shown in FIG. 3, a first color ink layer is printed as the layer adjacent to and abutting the substrate or base, such as upper 122, then structural ink layers are printed on top of the first color ink layer to build the three-dimensional object and contoured surface, and then a second color ink layer is printed on top of the structural ink layers. The color ink may be the same type of ink as the structural ink so that the color ink pixels and layers have volume and structure like the transparent structural pixels and layers. In the embodiment shown in FIG. 3, first layer 132 is a color ink layer and is positioned adjacent to and abutting upper 122. Second layer 134 is a structural layer and is printed adjacent to and abutting first layer 132. Third layer 136 includes alternating regions of color and structural pixels printed in selected pixel locations adjacent to and abutting second layer 134. Fourth layer 138 is a color layer and is printed adjacent to and abutting portions of second layer 134 and portions of third layer 136. Fourth layer 138 is discontinuous, as the color pixels are printed only on top of transparent pixels to establish regions with different heights to form the contoured surface. In this embodiment, the printed color pixels of third layer 136 and fourth layer 138 form the top or outermost surface of first functional element 126.

Those of ordinary skill in the art will recognize that the number of layers of functional element 126 and the pattern established by the structural layers may vary significantly depending on the target thickness for first functional element 126, the intended shape of contoured surface 130, the type of ink used, and the capabilities of printing device 102. For example, for the sake of simplicity, only four layers are provided in the embodiment shown in FIG. 3. In other embodiments, the number of layers may be lower or greater, depending upon the factors discussed above. To build a functional element like first functional element 126, the number of printed layers may be greater than four, and the pattern of printing may be more complex than shown.

Figure 4:
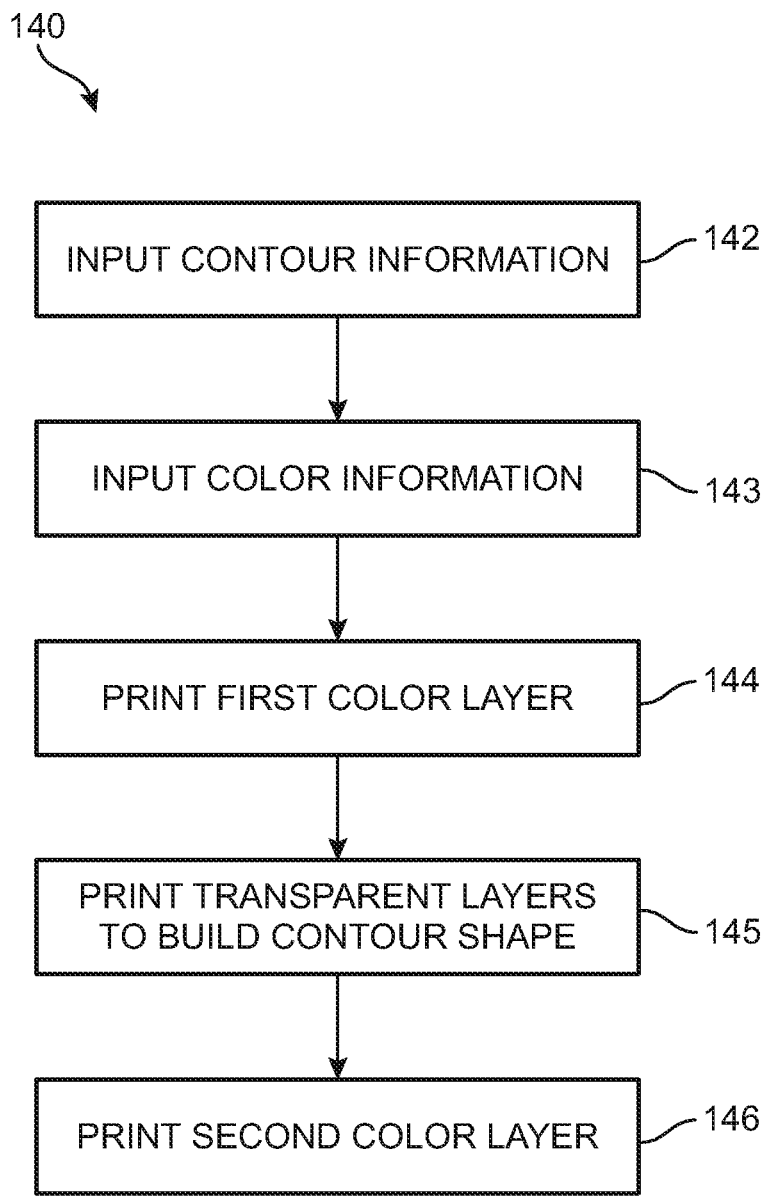
FIG. 4 is a flowchart of an embodiment of a method of printing a contour.

First functional element 126 with contoured surface 130 may be formed using a printing method such as a method of printing a contour 140 as shown in FIG. 4. In a first step 142 of method 140, contour information is input to printing device 102, such as by printing device 102 receiving the contour information from computing system 103. The contour information may be provided for the entirety of first functional element 126 or on a layer-by-layer basis. The contour information may be developed by computing system 103, such as by analyzing an image or other information provided by a user and determining how printing device 102 may be programmed, on a pixel-by-pixel or other printing location basis, how to build the contour. The contour information may include a target thickness for the three-dimensional object like first functional element 126. The contour information may include a target thickness for a portion or region of the three-dimensional object. A region may be a portion of the three-dimensional object with the same or similar thickness throughout. For example, first functional element 126 has four regions: a first region corresponding to first short raised portion 123, a second region corresponding to first tall raised portion 125, a third region corresponding to second short raised portion 127, and a fourth region corresponding to second tall raised portion 129. The regions are positioned adjacent to each other so that the regions are arranged to collectively form contoured surface 130, which is the supper surface of first functional element 126.

The contour information may include a predefined structural thickness for the three-dimensional object and/or each layer in the three-dimensional object. In some embodiments, computing system 103 may calculate the number of layers based upon the three-dimensional shape and a predefined thickness for the layers. Computing system 103 may calculate a thickness of any individual layer based upon the capabilities of printing device 102 and/or the type of ink to be used.

In a second step 143, color information is input to printing device 102, such as by printing device 102 receiving the color information from computing system 103. The color information may be provided for first functional element 126 as a whole or on a layer-by-layer basis. The color information may be developed by computing system 103, such as by analyzing an image or other information provided by a user and determining how printing device 102 may be programmed, on a pixel-by-pixel or other printing location basis. The color information may include color information for each color layer in the three-dimensional object. The color information may include a specific blend of base colors, such as when using the CMYK protocol. The color information may also include color intensity information, which may be programmed as a concentration of color particles within a structural ink matrix. Because of the capabilities of digital printing systems, this color information may be provided on a pixel-by-pixel basis. As will be apparent to those of skill in the art, the order of first step 142 and second step 143 may be interchangeable or may occur simultaneously.

A third step 144 includes printing a first color layer onto a substrate or base such as upper 122. Third step 144 may include introducing the base material to printing device 102. Third step 144 may also include using the color information provided for the first color layer to print the first color layer onto the base, such as upper 122.

A fourth step 145 includes printing a set of transparent structural layers onto the first color layer to build the three-dimensional shape with a contoured surface. The printing device may be a digital printer instructed in a pixel-by-pixel pattern of printing the structural layers using the received contour information from computing system 103.

A fifth step 146 includes printing a second color layer onto the set of transparent structural layers. Fifth step 146 may also include using the color information provided for the second color layer to print the second color layer onto the set of transparent structural layers.

An embodiment of an implementation of method 140 is shown in FIGS. 5-8. In this embodiment, a structure having the cross-sectional view shown in FIG. 3 is built. In this embodiment, each printed layer or portion of a layer has the same thickness. The contour is built by printing in only selected locations. Each pixel or designated printing location may be designated by the received contour information as having ink or no ink; in each pixel or other type of designated location, print head 104 may be designated to dispense ink/print or shut off/not print.

Figure 5:
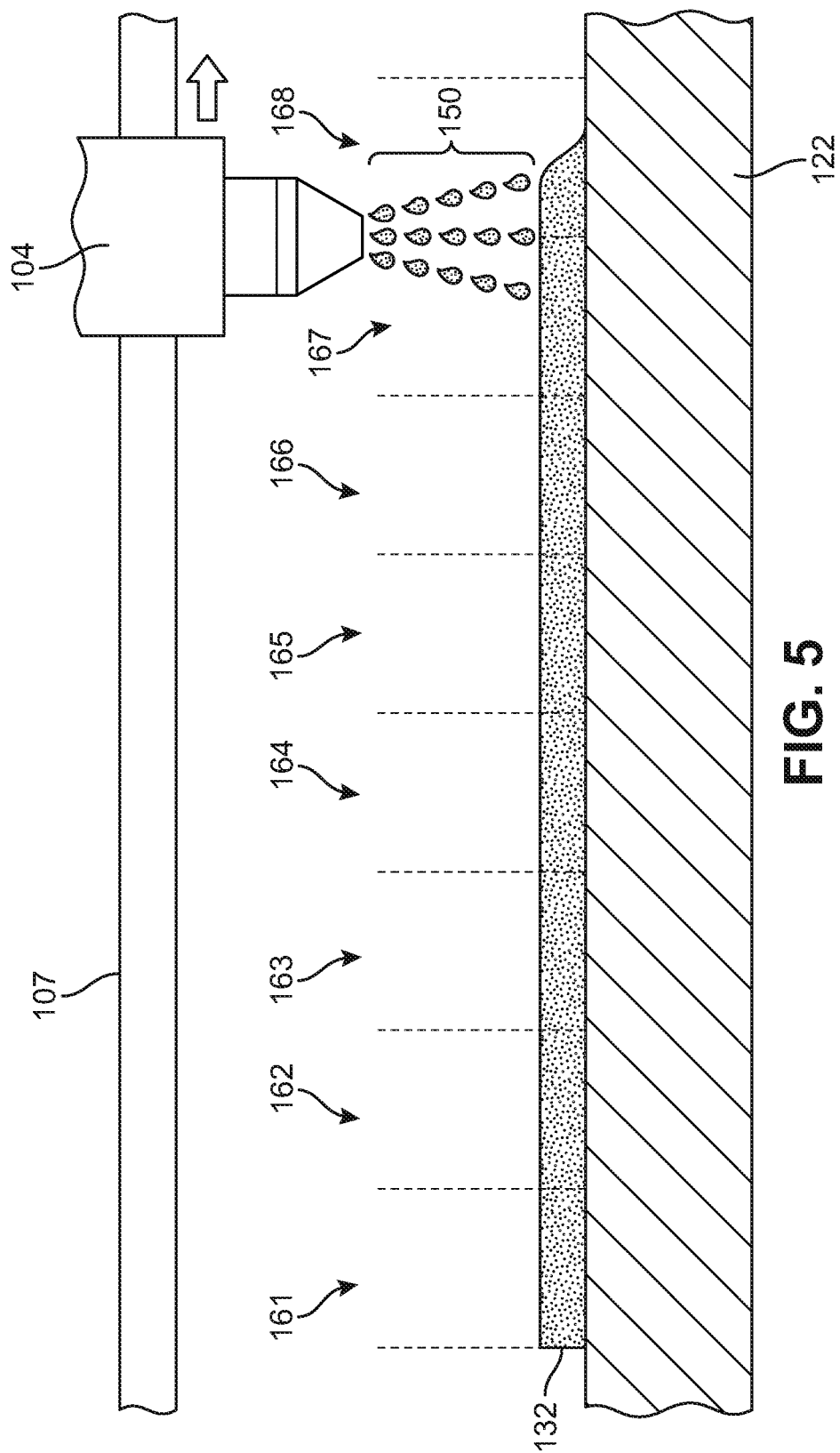
FIG. 5 shows an embodiment of a step of the method shown in FIG. 4, where a first color layer is printed onto a substrate.

FIG. 5 depicts an embodiment of an implementation of third step 144 where the first color layer is printed onto a base. Some embodiments of the printing device may include provisions that permit the print head to be moved across the base to facilitate printing of features, such as images, graphics, designs, and text onto the base. In some embodiments, the printing device may move the print head along the base. In other embodiments, the printing device may move the base in relation to the print head.

In embodiments where the printing device moves the print head, the printing device may move the print head in a direction parallel to any suitable number of axes. In some embodiments, the printing device may move the print head along a printing surface. Referring to FIG. 5, printing device 102 may move print head 104 along upper 122 to facilitate a printing onto upper 122. In the embodiment shown in FIG. 6, printing device 102 may translate print head 104 along a carriage bar 107 in direction substantially parallel to a surface of upper 122. Print head 104 may be translated along carriage bar 107 using any method known in the art, such as with a servo motor or other driving mechanism. In other embodiments, printing device 102 may move print head 104 relative to the base differently. In some embodiments, printing device 102 may move the article with respect to a stationary print head. For example, printing platform 106 (shown in FIG. 1) may be movable with respect to print head 104, such as in any of the directions shown in FIG. 1: a vertical direction 50, a horizontal direction 54, and a third, orthogonal direction 52.

In the embodiment shown in FIG. 5, the base, upper 122, has been divided into eight pixel printing locations: a first pixel location 161, a second pixel location 162, a third pixel location 163, a fourth pixel location 164, a fifth pixel location 165, a sixth pixel location 166, a seventh pixel location 167, and an eighth pixel location 168. These pixel printing locations are arranged to form a row. Print head 104 is moved along carriage bar 107 from first pixel location 161 to eighth pixel location 168. Print head 104 may dispense color ink as a specified volume of color ink droplets 150 according to the contour and color information provided by computing system 103 in first step 142 and second step 143 (which are not depicted). In this embodiment, print head 104 prints a continuous line of color ink to form first layer 132. Every pixel printing location, first pixel location 161, second pixel location 162, third pixel location 163, fourth pixel location 164, fifth pixel location 165, sixth pixel location 166, seventh pixel location 167, and eighth pixel location 168, is printed with color ink, and first layer 132 has a uniform thickness at each pixel printing location. In some embodiments, first layer 132 may have the same surface contour as upper 122. In other embodiments, first layer 132 may have a different surface contour as upper 122.

Figure 6:
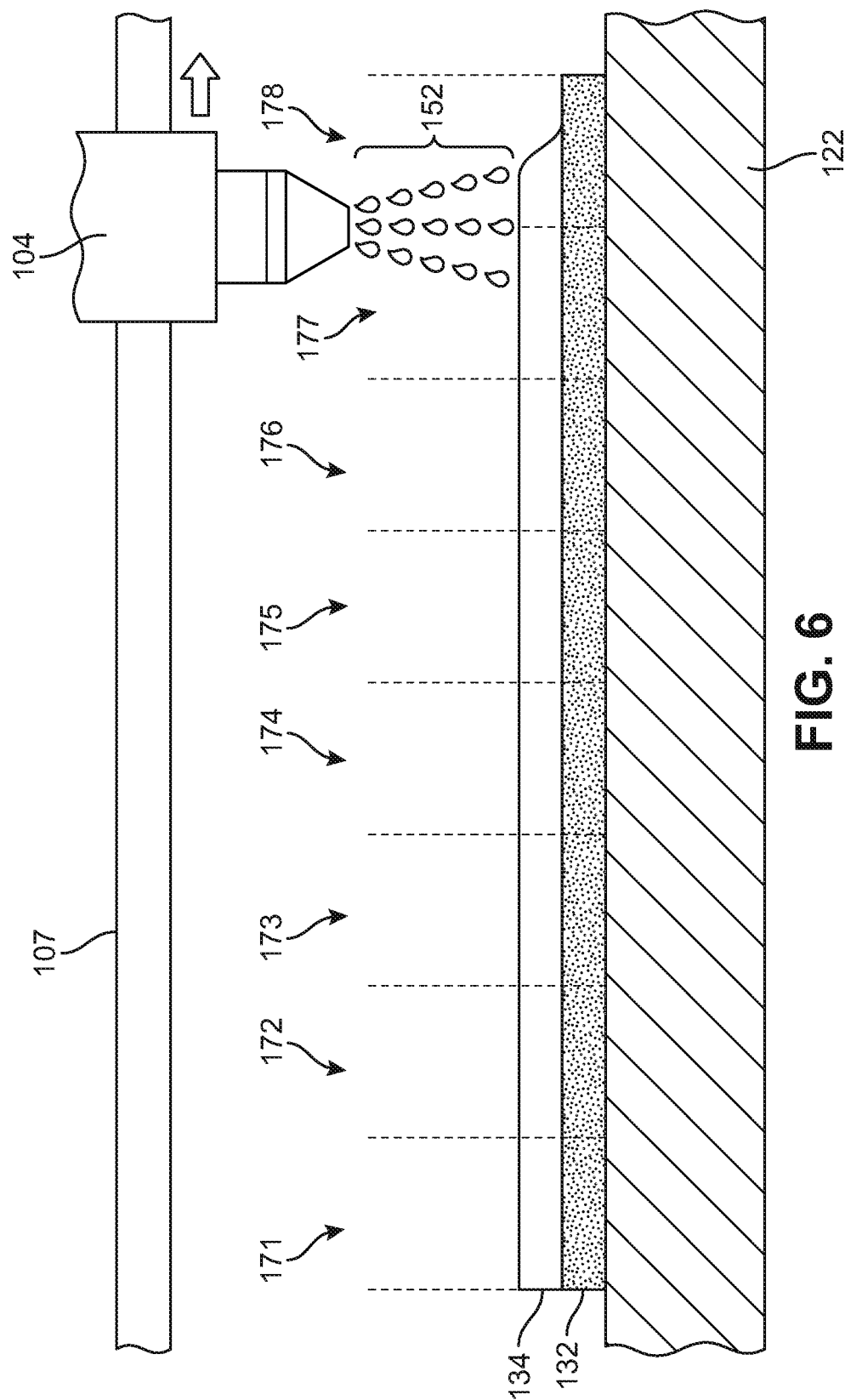
FIG. 6 shows an embodiment of a step of the method shown in FIG. 4, where a first structural layer is printed onto the first color layer.

Print head 104 may dispense and cure all of the color ink to form first layer 132 in a single pass, i.e., movement of print head 104 along carriage bar 107, or print head 104 may dispense and cure the color ink to form first layer 132 in multiple passes. FIG. 6 depicts an embodiment of an implementation of fourth step 145, where the transparent structural layers are printed onto the first color layer. In the embodiment shown in FIG. 6, the base, upper 122, has been divided again into eight pixel printing locations: a ninth pixel location 171, a tenth pixel location 172, a eleventh pixel location 173, a twelfth pixel location 174, a thirteenth pixel location 175, a fourteenth pixel location 176, a fifteenth pixel location 177, and a sixteenth pixel location 178. These pixel locations align with the pixel printing locations of first layer 132: first pixel location 161 corresponds with ninth pixel location 171; second pixel location 162 corresponds with tenth pixel location 172; third pixel location 163 corresponds with eleventh pixel location 173; fourth pixel location 164 corresponds with twelfth pixel location 174; fifth pixel location 165 corresponds with thirteenth pixel location 175; sixth pixel location 166 corresponds with fourteenth pixel location 176; seventh pixel location 167 corresponds with fifteenth pixel location 177; and eighth pixel location 168 corresponds with sixteenth pixel location 178 in a first direction. However, ninth pixel location 171, tenth pixel location 172, eleventh pixel location 173, twelfth pixel location 174, thirteenth pixel location 175, fourteenth pixel location 176, fifteenth pixel location 177, and sixteenth pixel location 178 are stacked on top of first pixel location 161, second pixel location 162, third pixel location 163, fourth pixel location 164, fifth pixel location 165, sixth pixel location 166, seventh pixel location 167, and eighth pixel location 168, respectively. Therefore, ninth pixel location 171, tenth pixel location 172, eleventh pixel location 173, twelfth pixel location 174, thirteenth pixel location 175, fourteenth pixel location 176, fifteenth pixel location 177, and sixteenth pixel location 178 are unique locations and may therefore correspond to unique contour printing information for digital printing.

In the embodiment shown in FIG. 6, print head 104 is translated along carriage bar 107 to print a continuous line of transparent structural ink to form second layer 134. Every pixel printing location, ninth pixel location 171, tenth pixel location 172, eleventh pixel location 173, twelfth pixel location 174, thirteenth pixel location 175, fourteenth pixel location 176, fifteenth pixel location 177, and sixteenth pixel location 178, is printed with transparent structural ink, and second layer 134 has a uniform thickness at each pixel printing location. In this embodiment, a surface contour of second layer 134 may be the same as that of first layer 132. Print head 104 may dispense and cure all of the structural ink to form second layer 134 in a single pass, i.e., movement of print head 104 along carriage bar 107, or print head 104 may dispense and cure the transparent structural ink to form second layer 134 in multiple passes.

Figure 7:
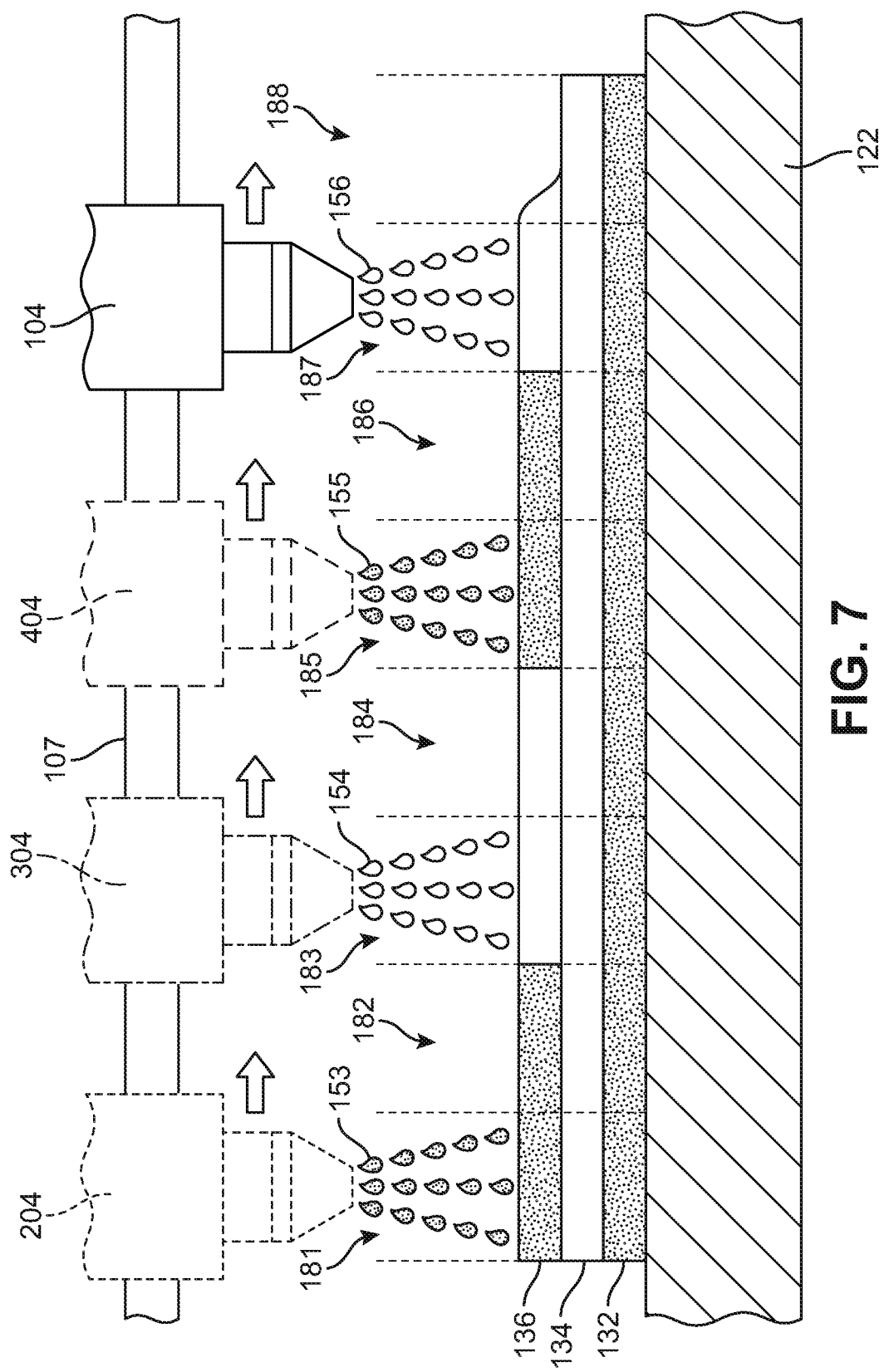
FIG. 7 shows an embodiment of a step of the method shown in FIG. 4, where a layer of alternating color ink and structural ink is printed onto the first structural layer.

FIG. 7 depicts an embodiment of a continued implementation of fourth step 145 where the transparent structural layers are printed to form a pattern to build the three-dimensional object with a contoured surface. In the embodiment shown in FIG. 7, the base, upper 122, has been divided again into eight pixel printing locations: a seventeenth pixel location 181, an eighteenth pixel location 182, a nineteenth pixel location 183, a twentieth pixel location 184, a twenty-first pixel location 185, a twenty-second pixel location 186, a twenty-third pixel location 187, and a twenty-fourth pixel location 188. As with the pixel printing locations of second layer 134, these pixel locations for third layer 136 align with the pixel printing locations of first layer 132: first pixel location 161 corresponds with seventeenth pixel location 181; second pixel location 162 corresponds with eighteenth pixel location 182; third pixel location 163 corresponds with nineteenth pixel location 183; fourth pixel location 164 corresponds with twentieth pixel location 184; fifth pixel location 165 corresponds with twenty-first pixel location 185; sixth pixel location 166 corresponds with twenty-second pixel location 186; seventh pixel location 167 corresponds with twenty-third pixel location 187; and eighth pixel location 168 corresponds with twenty-fourth pixel location 188 in a first direction. However, seventeenth pixel location 181, eighteenth pixel location 182, nineteenth pixel location 183, twentieth pixel location 184, twenty-first pixel location 185, twenty-second pixel location 186, twenty-third pixel location 187, and twenty-fourth pixel location 188 are pixels that are stacked on top of first pixel location 161, second pixel location 162, third pixel location 163, fourth pixel location 164, fifth pixel location 165, sixth pixel location 166, seventh pixel location 167, and eighth pixel location 168, respectively, as well as on top of ninth pixel location 171, tenth pixel location 172, eleventh pixel location 173, twelfth pixel location 174, thirteenth pixel location 175, fourteenth pixel location 176, fifteenth pixel location 177, and sixteenth pixel location 178, respectively. Therefore, seventeenth pixel location 181, eighteenth pixel location 182, nineteenth pixel location 183, twentieth pixel location 184, twenty-first pixel location 185, twenty-second pixel location 186, twenty-third pixel location 187, and twenty-fourth pixel location 188 are unique locations and may therefore correspond to unique contour printing information received from computing system 103 for digital printing.

In this embodiment, print head 104 prints a continuous line of ink to form third layer 136; however, third layer 136 has alternating segments of colored ink and transparent ink. Some pixel printing locations, such as seventeenth pixel location 181, eighteenth pixel location 182, twenty-first pixel location 185, and twenty-second pixel location 186, are printed with color ink. Other locations, such as nineteenth pixel location 183, twentieth pixel location 184, twenty-third pixel location 187, and twenty-fourth pixel location 188 are printed with transparent structural ink. Printing device 102 may be programmed to print these alternating colored and transparent segments that correspond to different regions of first functional element 126.

At a first point 204, print head 104 may dispense a first volume of colored ink droplets 153 to fill seventeenth pixel location 181 and eighteenth pixel location 182. At a second point 304, print head 104 may dispense a first volume of transparent structural ink droplets 154 to fill nineteenth pixel location 183 and twentieth pixel location 184. At a third point 404, print head 104 may dispense a second volume of colored ink droplets 155 to fill twenty-first pixel location 185 and twenty-second pixel location 186. At a final point, print head 104 may dispense a second volume of transparent structural ink droplets 156 to fill twenty-third pixel location 187 and twenty-fourth pixel location 188.

In this embodiment, third layer 136 has a uniform thickness at each pixel printing location. Print head 104 may dispense and cure all of the ink to form third layer 136 in a single pass, i.e., a movement of print head 104 along carriage bar 107 in a single direction, or print head 104 may dispense and cure the transparent structural ink to form third layer 136 in multiple print head 104 passes.

Figure 8:
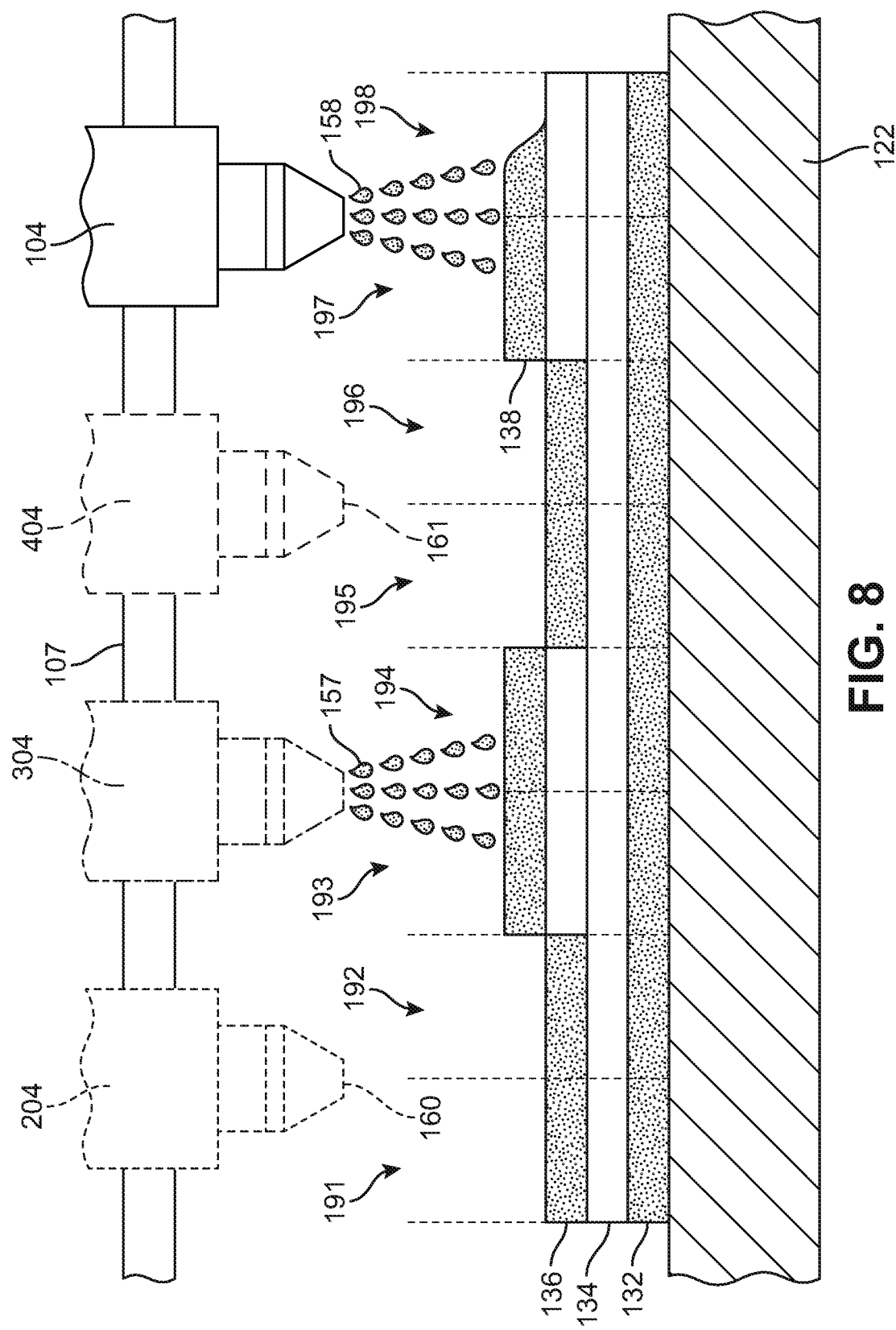
FIG. 8 shows an embodiment of a step of the method shown in FIG. 4, where color ink is selectively printed onto previously-printed structural ink.

FIG. 8 depicts an embodiment of an implementation of fifth step 146 where a second layer of colored ink is printed onto the structural and contoured layers. In the embodiment shown in FIG. 8, the base, upper 122, has been divided again into eight pixel printing locations: a twenty-fifth pixel location 191, a twenty-sixth pixel location 192, a twenty-seventh pixel location 193, a twenty-eighth pixel location 194, a twenty-ninth pixel location 195, a thirtieth pixel location 196, a thirty-first pixel location 197, and a thirty-second pixel location 198. As with the pixel printing locations of second layer 134 and third layer 136, these fourth layer pixel printing locations align with the pixel printing locations of first layer 132, second layer 134, and third layer 136. However, twenty-fifth pixel location 191, twenty-sixth pixel location 192, twenty-seventh pixel location 193, twenty-eighth pixel location 194, twenty-ninth pixel location 195, thirtieth pixel location 196, thirty-first pixel location 197, and thirty-second pixel location 198 are stacked on top of first pixel location 161, second pixel location 162, third pixel location 163, fourth pixel location 164, fifth pixel location 165, sixth pixel location 166, seventh pixel location 167, and eighth pixel location 168, respectively, as well as on top of ninth pixel location 171, tenth pixel location 172, eleventh pixel location 173, twelfth pixel location 174, thirteenth pixel location 175, fourteenth pixel location 176, fifteenth pixel location 177, and sixteenth pixel location 178, respectively, and on top of seventeenth pixel location 181, eighteenth pixel location 182, nineteenth pixel location 183, twentieth pixel location 184, twenty-first pixel location 185, twenty-second pixel location 186, twenty-third pixel location 187, and twenty-fourth pixel location 188, also respectively. Therefore, twenty-fifth pixel location 191, twenty-sixth pixel location 192, twenty-seventh pixel location 193, twenty-eighth pixel location 194, twenty-ninth pixel location 195, thirtieth pixel location 196, thirty-first pixel location 197, and thirty-second pixel location 198 are unique locations and may therefore correspond to unique contour and color printing information received from computing system 103.

In this embodiment, print head 104 prints a discontinuous line of ink to form fourth layer 138. Some pixel printing locations, such as twenty-fifth pixel location 191, twenty-sixth pixel location 192, twenty-ninth pixel location 195, and thirtieth pixel location 196 are not printed. In these locations, print head 104 is shut off and dispenses no ink. Other locations, such as twenty-seventh pixel location 193, twenty-eighth pixel location 194, thirty-first pixel location 197, and thirty-second pixel location 198 are printed with color ink.

Printing device 102 may be programmed to print these alternating segments. At first point 204, print head 104 may be placed in a first shut-off condition 160 and directed to dispense no ink to leave twenty-fifth pixel location 191 and twenty-sixth pixel location 192 empty. At second point 304, print head 104 may dispense a third volume of colored ink droplets 157 to fill twenty-seventh pixel location 193 and twenty-eighth pixel location 194. At third point 404, print head 104 may be placed in a second shut-off condition 169 and directed to dispense no ink to leave twenty-ninth pixel location 195 and thirtieth pixel location 196 empty. At a final point, print head 104 may dispense a fourth volume of colored ink droplets 158 to fill thirty-first pixel location 197 and thirty-second pixel location 198. In this embodiment, the printed pixel locations of fourth layer 138 have a uniform thickness at each pixel printing location. The empty pixel locations create an upper surface formed by the color ink printed portions of third layer 136 and the color ink printed portions of fourth layer 138. The contour of the upper surface is the target contour. Print head 104 may dispense and cure all of the ink to form fourth layer 138 in a single pass, i.e., a movement of print head 104 along carriage bar 107 in a single direction, or print head 104 may dispense and cure the ink to form fourth layer 138 in multiple print head 104 passes.

In the embodiment shown in FIG. 3 and printed using the method shown in FIGS. 5-8, all layers and pixels have the same thickness. Contoured surface 130 is formed by varying the height of adjacent columns of pixels in adjacent regions. As discussed above, this height variation occurs when some potentially printed pixel locations are not printed so that those pixels remain empty or free of ink to form short columns while in some adjacent columns or columns separated from the short columns have all potential pixel printing locations printed with ink to form tall columns. In the embodiment shown in FIG. 3, therefore, some columns have three printed pixels and other columns have four printed pixels, with each pixel being approximately the same size. The pattern of short and tall columns forms contoured surface 130. Contoured surface 130 has a different contour than the surface of upper 122, so first functional element 126 is a raised, three-dimensional object that can be differentiated from the remainder of upper 122.

Figure 9:
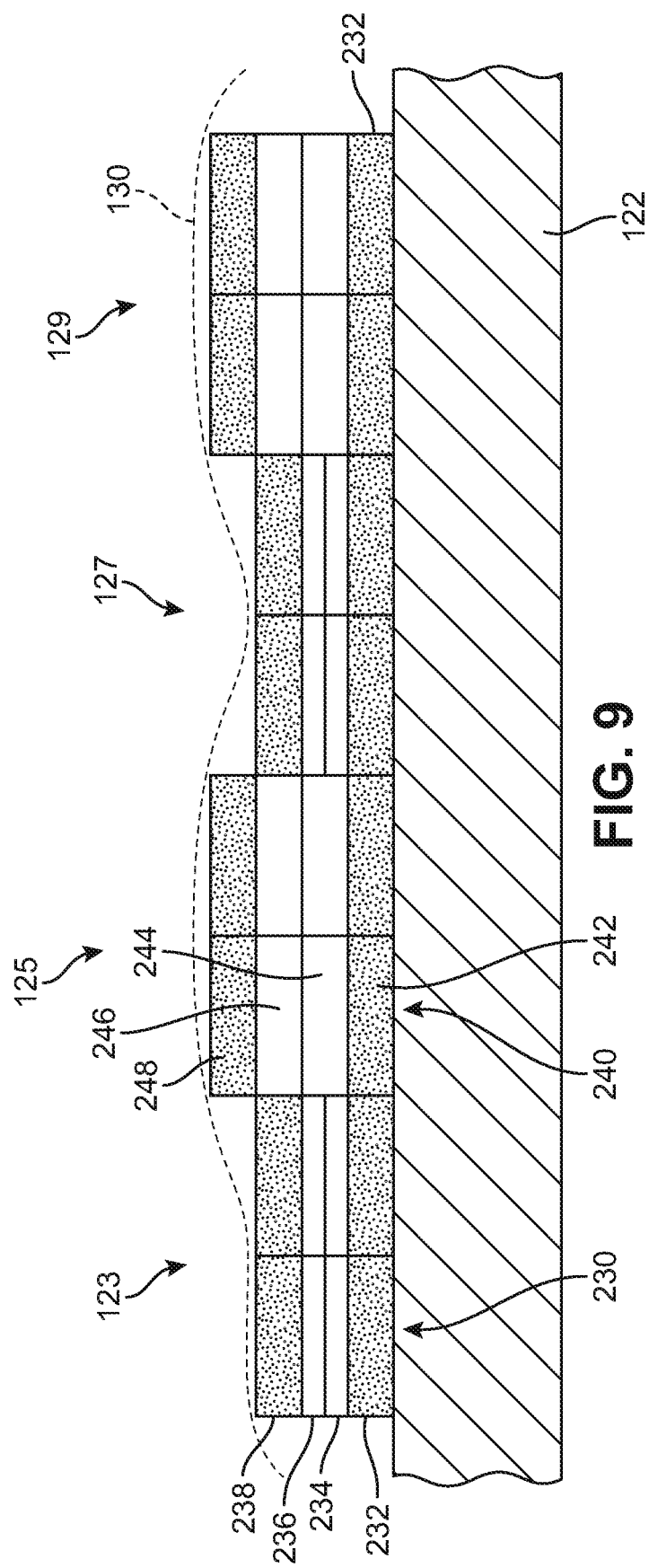
FIG. 9 shows an embodiment of the same contour shown in FIG. 3, but where the contoured surface has been formed by varying the heights of columns of ink by selectively varying the thickness of portions of printed ink layers.

In other embodiments, however, the same contour may be achieved using a slightly different printing method. The cross-section achieved using the alternate printing method is shown in FIG. 9. As shown in FIG. 9, contoured surface 130 is also formed by a pattern of short columns such as short column 230 and tall columns such as tall column 240. However, each and every column shown in FIG. 9 includes four printed pixels. Some of the printed pixels have a full thickness while other printed pixels are half as high or have 50% the height of the full thickness pixel. For example, short column 230 includes two 50% height pixels and two full thickness pixels. Tall column 240 includes four full thickness printed pixels. The net effect is the same as the embodiment shown in FIG. 3: tall columns are 25% taller than short columns. The capabilities of digital printing allow the system to precisely control the dispensing of discrete volumes of ink in a pixel. These volumes of ink correspond to the thickness of the printed pixel. The printing of print head 104 is never interrupted when printing the embodiment shown in FIG. 9, which may result in lower printing times. The method of printing to achieve the cross-section shown in FIG. 9 is shown in FIGS. 10-13. These figures also follow the general method shown in FIG. 4.

Figure 10:
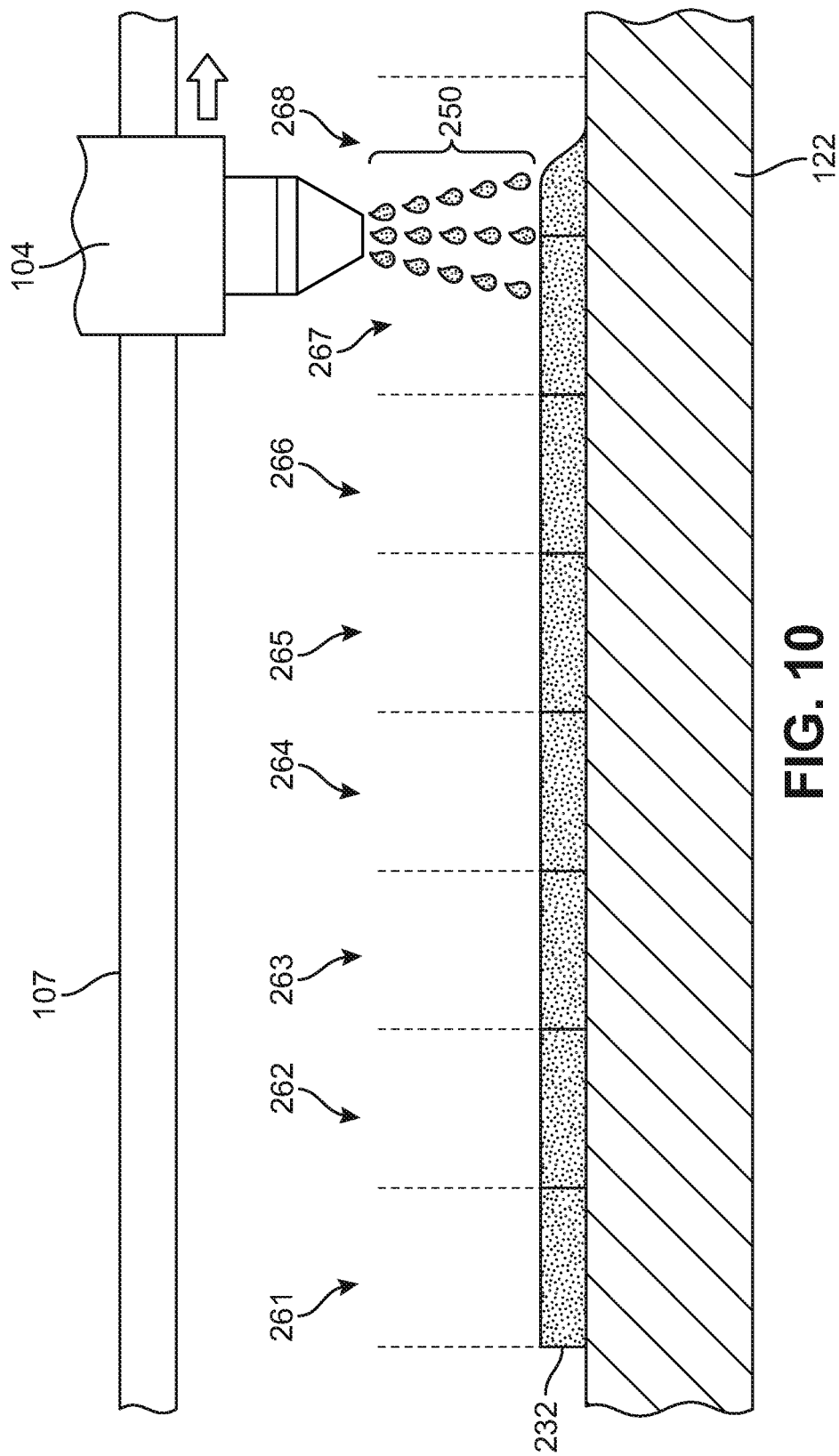
FIG. 10 shows an embodiment of a step of the method shown in FIG. 4, where a first color layer is printed onto a substrate.

In the embodiment shown in FIG. 10, the base, upper 122, has been divided into eight pixel printing locations: a first pixel location 261, a second pixel location 262, a third pixel location 263, a fourth pixel location 264, a fifth pixel location 265, a sixth pixel location 266, a seventh pixel location 267, and an eighth pixel location 268. These pixel printing locations are arranged adjacent to each other to form a row. Print head 104 is moved along a carriage bar 107 from first pixel location 261 to eighth pixel location 268. Print head 104 may dispense color ink as a specified first color ink volume 250 according to the contour and color information provided by computing system 103 in first step 142 and second step 143 (which are not depicted). In this embodiment, print head 104 prints a continuous line of color ink to form first color layer 232. In this embodiment, color ink may also be structural ink so that first color layer 232 is also a structural layer. Every pixel printing location, first pixel location 261, second pixel location 262, third pixel location 263, fourth pixel location 264, fifth pixel location 265, sixth pixel location 266, seventh pixel location 267, and eighth pixel location 268, is printed with the same volume of color ink. First color layer 232 has a uniform thickness at each pixel printing location. Print head 104 may dispense and cure all of the color ink to form first color layer 232 in a single pass, i.e., movement of print head 104 along carriage bar 107, or print head 104 may dispense and cure the color ink to form first color layer 232 in multiple passes.

Figure 11:
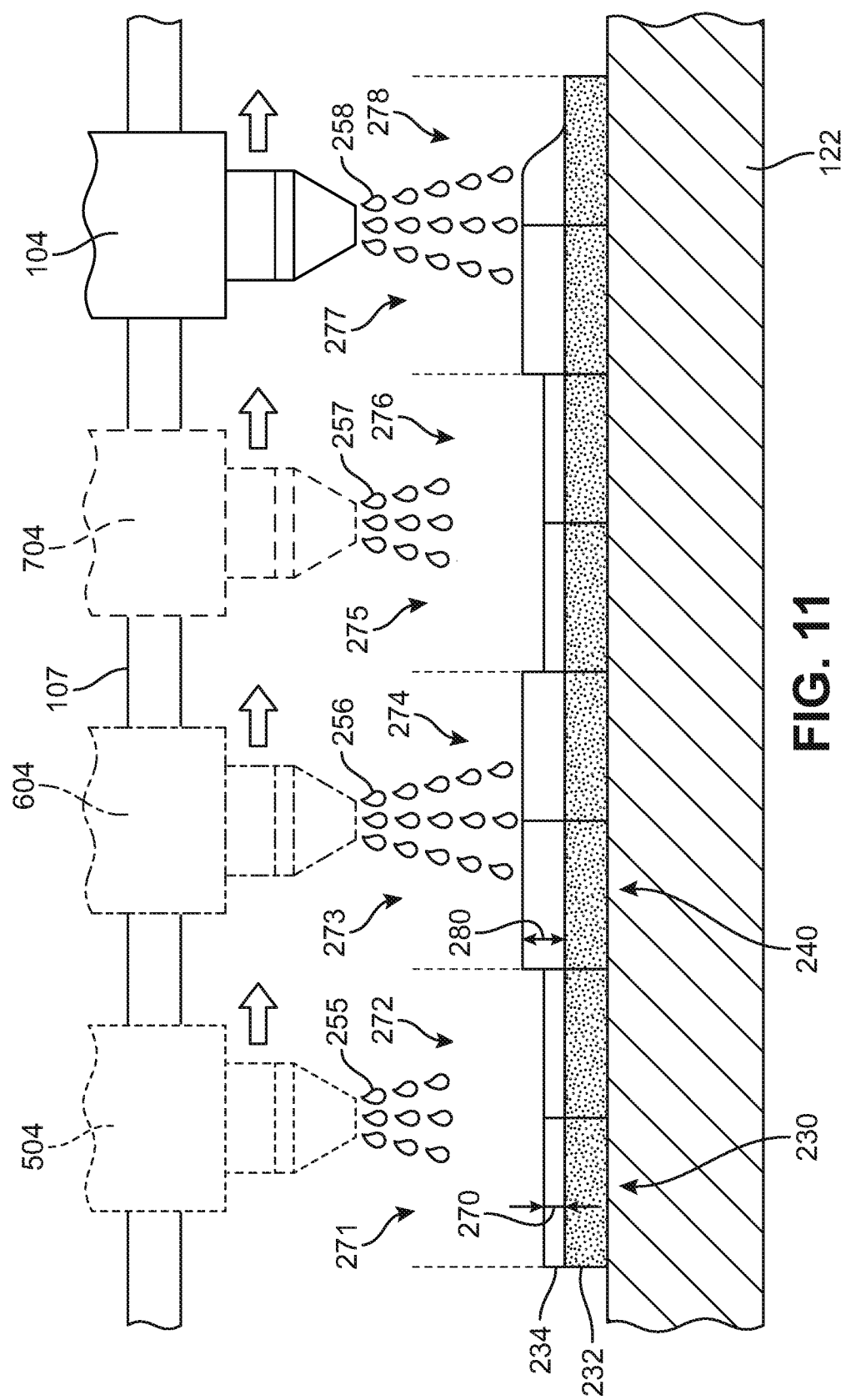
FIG. 11 shows an embodiment of a step of the method shown in FIG. 4, where a first structural layer is printed onto the first color layer and where the thickness of the first structural layer selectively varies.

FIG. 11 depicts an embodiment of an implementation of fourth step 145, where the transparent structural layers are printed onto the first color layer. In the embodiment shown in FIG. 11, the base, upper 122, has been divided again into eight pixel printing locations: a ninth pixel location 271, a tenth pixel location 272, a eleventh pixel location 273, a twelfth pixel location 274, a thirteenth pixel location 275, a fourteenth pixel location 276, a fifteenth pixel location 277, and a sixteenth pixel location 278. These pixel locations align with the pixel printing locations of first color layer 232: first pixel location 261 corresponds with ninth pixel location 271; second pixel location 262 corresponds with tenth pixel location 272; third pixel location 263 corresponds with eleventh pixel location 273; fourth pixel location 264 corresponds with twelfth pixel location 274; fifth pixel location 265 corresponds with thirteenth pixel location 275; sixth pixel location 266 corresponds with fourteenth pixel location 276; seventh pixel location 267 corresponds with fifteenth pixel location 277; and eighth pixel location 268 corresponds with sixteenth pixel location 278 in a first direction. However, ninth pixel location 271, tenth pixel location 272, eleventh pixel location 273, twelfth pixel location 274, thirteenth pixel location 275, fourteenth pixel location 276, fifteenth pixel location 277, and sixteenth pixel location 278 are stacked on top of first pixel location 261, second pixel location 262, third pixel location 263, fourth pixel location 264, fifth pixel location 265, sixth pixel location 266, seventh pixel location 267, and eighth pixel location 268, respectively. Therefore, ninth pixel location 271, tenth pixel location 272, eleventh pixel location 273, twelfth pixel location 274, thirteenth pixel location 275, fourteenth pixel location 276, fifteenth pixel location 277, and sixteenth pixel location 278 are unique locations and may therefore correspond to unique contour printing information.

In the embodiment shown in FIG. 11, print head 104 is translated along carriage bar 107 to print a continuous line of transparent structural ink to form first transparent layer 234. Every pixel printing location, ninth pixel location 271, tenth pixel location 272, eleventh pixel location 273, twelfth pixel location 274, thirteenth pixel location 275, fourteenth pixel location 276, fifteenth pixel location 277, and sixteenth pixel location 278, is printed with transparent structural ink. However, first transparent layer 234 has different pixel thicknesses in selected locations. For example, ninth pixel location 271, tenth pixel location 272, thirteenth pixel location 275, and fourteenth pixel location 276 have 50% of the thickness of eleventh pixel location 273, twelfth pixel location 274, fifteenth pixel location 277, and sixteenth pixel location 278, which are full thickness pixels.

In some embodiments, the variation in pixel thickness may be achieved by programming print head 104 to dispense a different volumes of ink in different pixel locations while print head 104 travels on carriage bar 107 at a constant speed. For example, to achieve a 50% reduction in thickness of selected pixels compared to other pixels, a 50% reduction in ink volume may be dispensed at selected printing locations. In the embodiment shown in FIG. 11, at a first printing point 504, print head 104 dispenses a first volume of transparent ink 255 onto ninth pixel location 271 and tenth pixel location 272. First volume of transparent ink 255 is sufficient to produce a short pixel in ninth pixel location 271 having a short height 270. At a second printing point 604, print head 104 dispenses a second volume of transparent ink 256 onto eleventh pixel location 273 and twelfth pixel location 274.

Second volume of transparent ink 256 is sufficient to produce a full thickness pixel in eleventh pixel location 273 having a full thickness 280. First volume of transparent ink 255 is half of second volume of transparent ink 256, and short height 270 is half of full thickness 280. In other embodiments, different volumes of ink may produce different thicknesses.

At a third printing point 704, print head 104 dispenses a third volume of transparent ink 257 onto thirteenth pixel location 275 and fourteenth pixel location 276. Third volume of transparent ink 257 is sufficient to produce a short pixel in ninth pixel location 271 having a short height 270. At a second printing point 604, print head 104 dispenses a second volume of transparent ink 256 onto eleventh pixel location 273 and twelfth pixel location 274. Second volume of transparent ink 256 is sufficient to produce a full thickness pixel in eleventh pixel location 273 having a full thickness 280.

In other embodiments, not shown, the variation in height of selected pixels may be produced by varying the speed of print head 104 on carriage bar 107 while print head 104 dispenses ink at a constant flow rate. In selected locations, print head 104 may move faster on carriage bar 107 to dispense less ink onto those selected locations for thinner pixels. In other specified locations, print head 104 may move more slowly so that more ink is dispensed in those locations for thicker pixels.

Print head 104 may dispense and cure all of the structural ink to form first transparent layer 234 in a single pass, i.e., movement of print head 104 along carriage bar 107, or print head 104 may dispense and cure the transparent structural ink to form second layer 134 in multiple passes.

Figure 12:
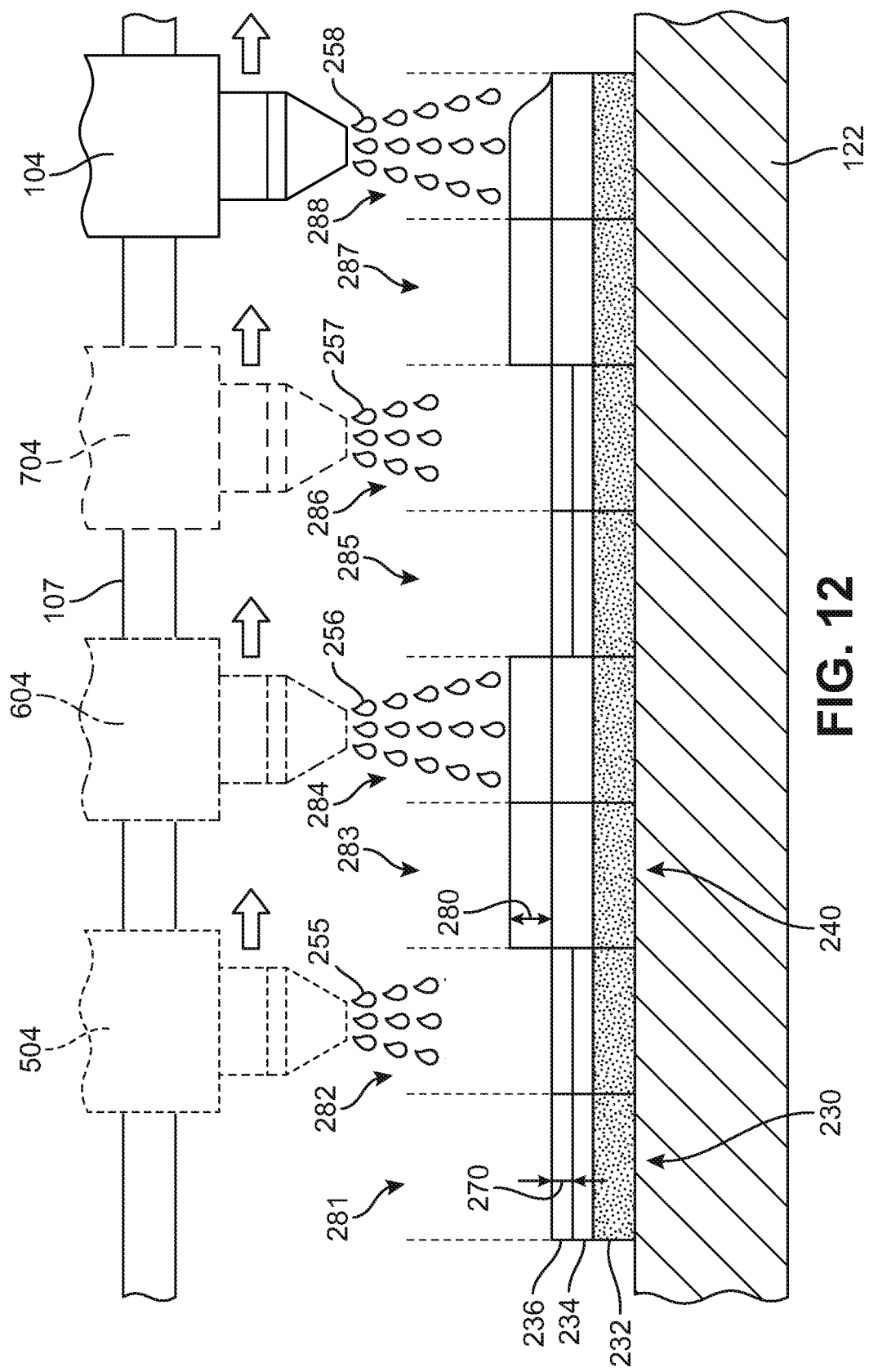
FIG. 12 shows an embodiment of a step of the method shown in FIG. 4, where a second structural layer is printed onto the first structural layer and where the thickness of the second structural layer selectively varies.

FIG. 12 depicts an embodiment of a continued implementation of fourth step 145 where the transparent structural layers are printed to form a pattern to build the three-dimensional object with a contoured surface. In the embodiment shown in FIG. 12, the base, upper 122, has been divided again into eight pixel printing locations: a seventeenth pixel location 281, an eighteenth pixel location 282, a nineteenth pixel location 283, a twentieth pixel location 284, a twenty-first pixel location 285, a twenty-second pixel location 286, a twenty-third pixel location 287, and a twenty-fourth pixel location 288. As with the pixel printing locations of first transparent layer 234, these pixel locations for second transparent layer 236 pixel printing location align with the pixel printing locations of first color layer 232: first pixel location 261 corresponds with seventeenth pixel location 281; second pixel location 262 corresponds with eighteenth pixel location 282; third pixel location 263 corresponds with nineteenth pixel location 283; fourth pixel location 264 corresponds with twentieth pixel location 284; fifth pixel location 265 corresponds with twenty-first pixel location 285; sixth pixel location 266 corresponds with twenty-second pixel location 286; seventh pixel location 267 corresponds with twenty-third pixel location 287; and eighth pixel location 268 corresponds with twenty-fourth pixel location 288 in a first direction. However, seventeenth pixel location 281, eighteenth pixel location 282, nineteenth pixel location 283, twentieth pixel location 284, twenty-first pixel location 285, twenty-second pixel location 286, twenty-third pixel location 287, and twenty-fourth pixel location 288 are pixels that are stacked on top of the pixels of first color layer 232 and first transparent layer 234. Therefore, seventeenth pixel location 281, eighteenth pixel location 282, nineteenth pixel location 283, twentieth pixel location 284, twenty-first pixel location 285, twenty-second pixel location 286, twenty-third pixel location 287, and twenty-fourth pixel location 288 are unique locations and may therefore correspond to unique contour printing information received from computing system 103.

In this embodiment, print head 104 continuously prints ink to form second transparent layer 236. In this embodiment, the pattern of the printed pixels of second transparent layer 236 is the same as the pattern of the printed pixels of first transparent layer 234.

In the embodiment shown in FIG. 12, print head 104 is translated along carriage bar 107 to print a line of transparent structural ink to form second transparent layer 236. Every pixel printing location, seventeenth pixel location 281, eighteenth pixel location 282, nineteenth pixel location 283, twentieth pixel location 284, twenty-first pixel location 285, twenty-second pixel location 286, twenty-third pixel location 287, and twenty-fourth pixel location 288, is printed with transparent structural ink. However, first transparent layer 234 has different pixel thicknesses in selected locations according to the specifications of the contour information received from computing system 103. For example, the printed pixels in seventeenth pixel location 281, eighteenth pixel location 282, twenty-first pixel location 285, and twenty-second pixel location 286 have 50% of the thickness of which are full thickness pixels.

Figure 13:
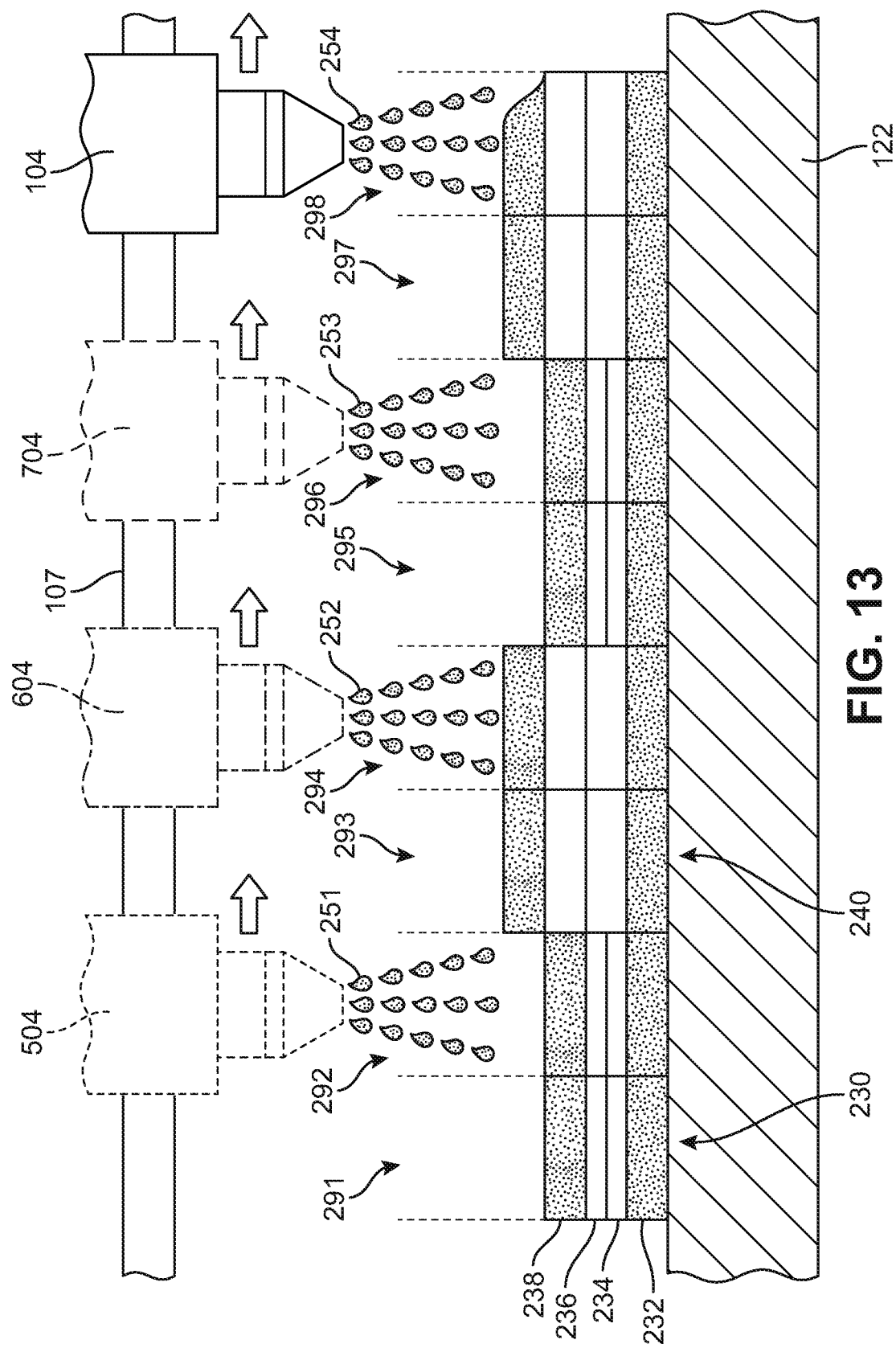
FIG. 13 shows an embodiment of a step of the method shown in FIG. 4, where a layer of color ink is printed onto the second structural layer.

FIG. 13 depicts an embodiment of an implementation of fifth step 146 where a second layer of colored ink is printed onto the structural and contoured layers. In the embodiment shown in FIG. 13, the base, upper 122, has been divided again into eight pixel printing locations: a twenty-fifth pixel location 291, a twenty-sixth pixel location 292, a twenty-seventh pixel location 293, a twenty-eighth pixel location 294, a twenty-ninth pixel location 295, a thirtieth pixel location 296, a thirty-first pixel location 297, and a thirty-second pixel location 298. These fourth layer pixel printing locations also form a row. As with the pixel printing locations of second layer 134 and third layer 136, these fourth layer pixel printing locations align with and are stacked on top of the pixel printing locations of first layer 132, second layer 134, and third layer 136. Therefore, twenty-fifth pixel location 291, twenty-sixth pixel location 292, twenty-seventh pixel location 293, twenty-eighth pixel location 294, twenty-ninth pixel location 295, thirtieth pixel location 296, thirty-first pixel location 297, and thirty-second pixel location 298 are unique locations and may therefore correspond to unique contour and color printing information received from computing system 103.

In this embodiment, print head 104 prints a line of ink to form second color layer 238. While each printing location receives ink, some pixel printing locations, such as twenty-fifth pixel location 191, twenty-sixth pixel location 192, twenty-ninth pixel location 195, and thirtieth pixel location 196 are printed on top of columns with reduced thickness pixels. Other locations, such as twenty-seventh pixel location 293, twenty-eighth pixel location 294, thirty-first pixel location 297, and thirty-second pixel location 298 are printed on top of columns with only full thickness pixels. Therefore, in some regions, second color layer 238 is printed on top of a short column while in other regions, second color layer 238 is printed on top of a tall column. Print head 104 may, therefore, print a continuous volume of ink. At first prior point 204, print head 104 may dispense first color ink volume 251. At second prior point 304, print head 104 may dispense a second color ink volume 252. At third prior point 404, print head 104 may dispense a third color ink volume 253. At a current printing point, print head 104 may dispense a fourth color ink volume 254. First color ink volume 251, second color ink volume 252, third color ink volume 253, and fourth color ink volume 254 are all the same so that second color layer 238 has uniform thickness in all pixels even if the pixels of second color layer 238 are printed at different distances above upper 122. In this embodiment, the target surface contour for the three-dimensional object as provided by computing system 103 is the same that the top color layer.

In some embodiments, all of the color layers may have the same color or color pattern based upon identical color information. In other embodiments, separate color layers may each have different colors or color patterns using different, unique, or layer-specific color information. In some embodiments, portions of separate color layers may have the same color or color pattern as portions of other color layers, while other portions or regions of the color layers may have different colors or color patterns.

Figure 14:
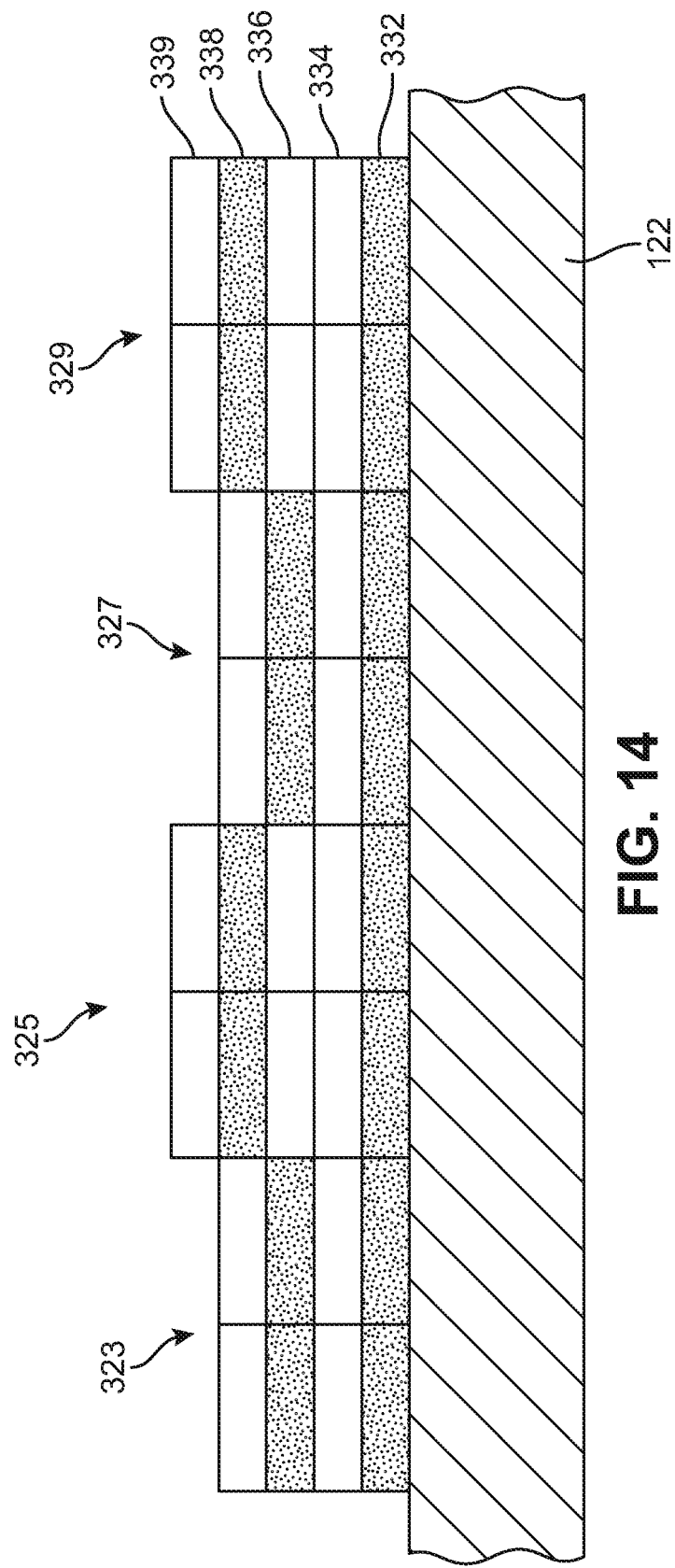
FIG. 14 shows an embodiment of a contoured surface having a final structural layer printed on top of all layers.

FIG. 14 shows another embodiment of a cross-section of a three-dimensional color object that has been printed on a base such as upper 122. The embodiment shown in FIG. 14 is similar in most respects to the embodiment shown in FIG. 3, where different regions of the element are different heights to establish a three-dimensional element with a contoured surface. First region 323 is a short column formed from four printed pixels. Second region 325 is adjacent to first region 323 and is a tall column formed from five printed pixels. A third region 327 is adjacent to second region 325 and is a short column formed from four printed pixels. A fourth region 329 is adjacent to third region 327 and is a tall column formed from five printed pixels.

As in the embodiment shown in FIG. 3, the pixels are arranged in layers. A first printed color layer 332 is printed onto a base such as upper 122. First printed color layer 332 is a continuous layer of color ink of uniform thickness. A first printed transparent layer 334 is printed onto first printed color layer 332. First printed transparent layer 334 is a continuous layer of transparent ink of uniform thickness. A first alternating layer 336 is printed onto first printed transparent layer 334. First alternating layer 336 is a continuous layer of ink, with color ink being printed in first region 323 and third region 327 and transparent ink being printed in second region 325 and fourth region 329. A second alternating layer 338 is printed onto first alternating layer 336. Second alternating layer 338 is a continuous layer of ink, with transparent ink being printed in first region 323 and third region 327 and color ink being printed in second region 325 and fourth region 329. The alternating pattern of color ink and transparent ink of first alternating layer 336 is opposite to the alternating pattern of color ink and transparent ink of second alternating layer 338. A final layer 339 is a discontinuous layer of transparent ink. Because first region 323 and third region 327 already have a color layer topped with a transparent layer, final layer 339 is printed only in second region 325 and fourth region 329.

In this fashion, a three-dimensional color object is formed in the same way that the three-dimensional color object shown in FIG. 3 was formed. However, the top layer of the three-dimensional color object shown in FIG. 3 is a color layer while the top layer of the three-dimensional color object shown in FIG. 14 is a transparent layer that covers a color layer. In this embodiment, the target surface contour for the three-dimensional object as provided by computing system 103 is the same that the top transparent layer. The second color layer in the embodiment shown in FIG. 14 may be protected by the transparent layer, or the transparent layer may add a gloss to an otherwise matte look of the three-dimensional object.

Figure 15:
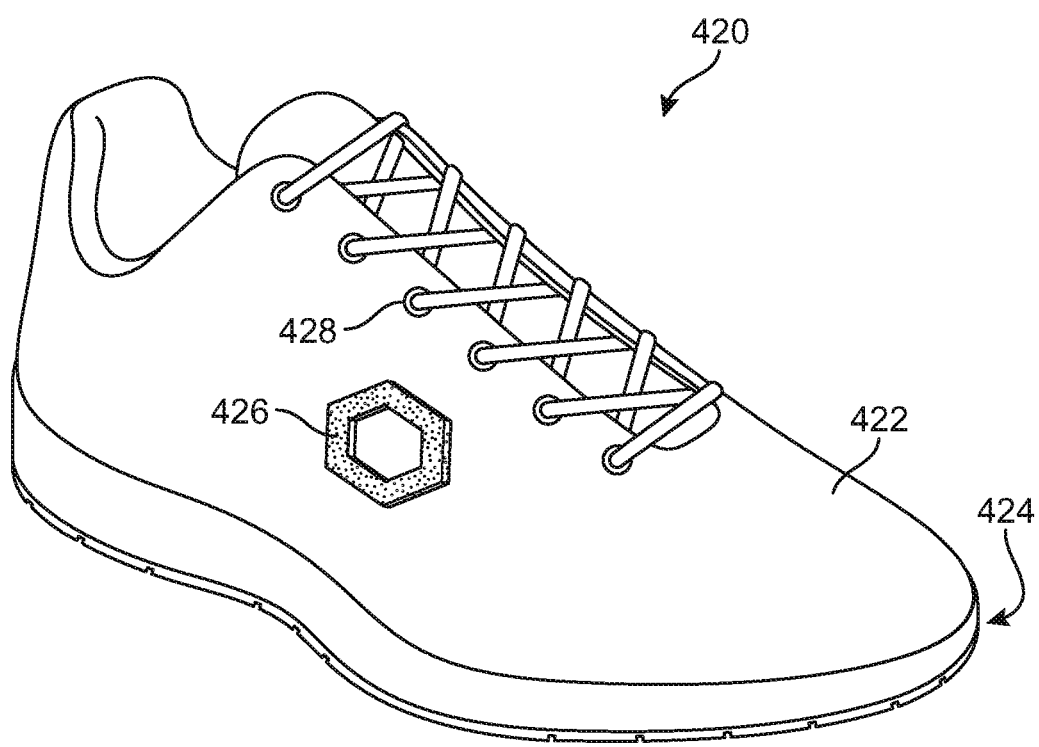
FIG. 15 shows an embodiment of an article of footwear with a three-dimensional colored and contoured object printed on the upper, where the contoured object is a graphical element.

The embodiments discussed above show and discuss functional elements as the three-dimensional color object printed onto the article. FIG. 15 shows another embodiment where one three-dimensional color object is primarily aesthetic and another is primarily functional. FIG. 15 shows a second article of footwear 420, which is shown as an athletic shoe but may be any type of article of footwear known in the art. Second article of footwear 420 includes an upper 422 attached to a sole 424. Upper 422 includes a three-dimensional color aesthetic object, graphical element 426. The term "graphic" as used throughout this detailed description and in the claims refers to any visual design elements including, but not limited to: photos, logos, text, illustrations, lines, shapes, images of various kinds as well as any combinations of these elements. Moreover, the term graphic is not intended to be limiting and could incorporate any number of contiguous or non-contiguous visual features. For example, in one embodiment, a graphic may comprise a logo that is applied to a small region of an article of footwear. In another embodiment, a graphic may comprise a large region of color that is applied over one or more regions of an article of clothing.

In this embodiment, upper 422 also includes a three-dimensional functional element, eyelet reinforcement 428. Both types of three-dimensional color objects may be printed using any of the methods discussed above. Further, both types of three-dimensional color objects may be printed at different times or simultaneously. The printing methods discussed above may be adapted to any combination of functional and aesthetic three-dimensional color objects with contoured surfaces.

Figure 16:
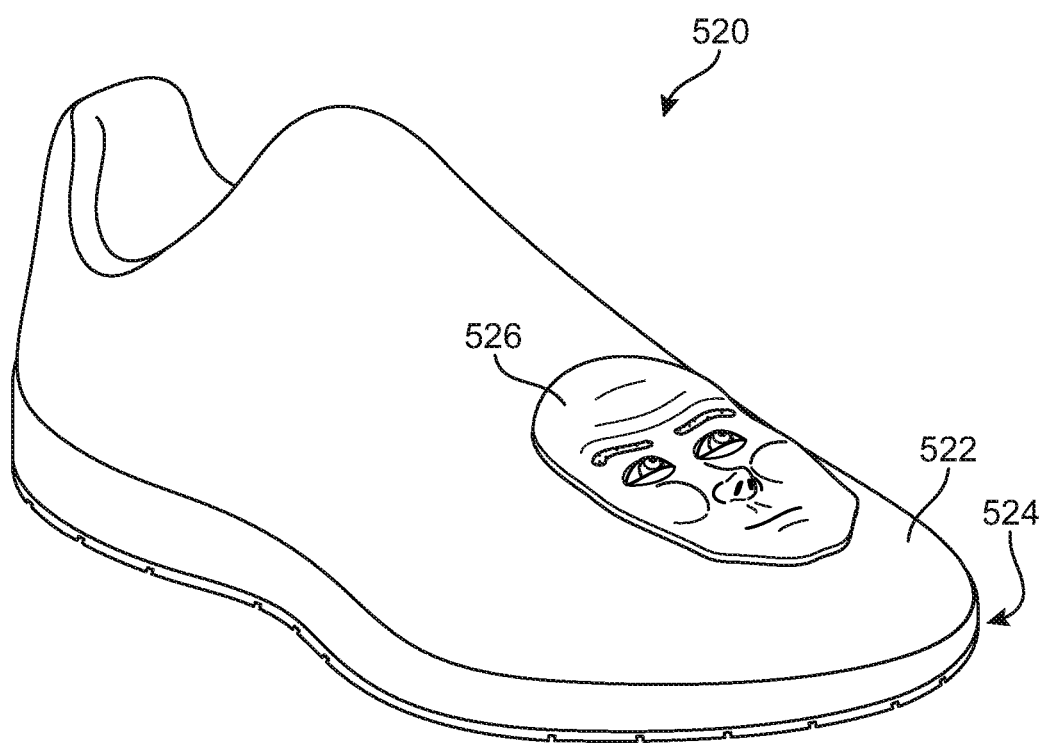
FIG. 16 shows another embodiment of an article of footwear with a three-dimensional colored and contoured object printed on the upper, where the contoured object is a graphical element.
Figure 17:
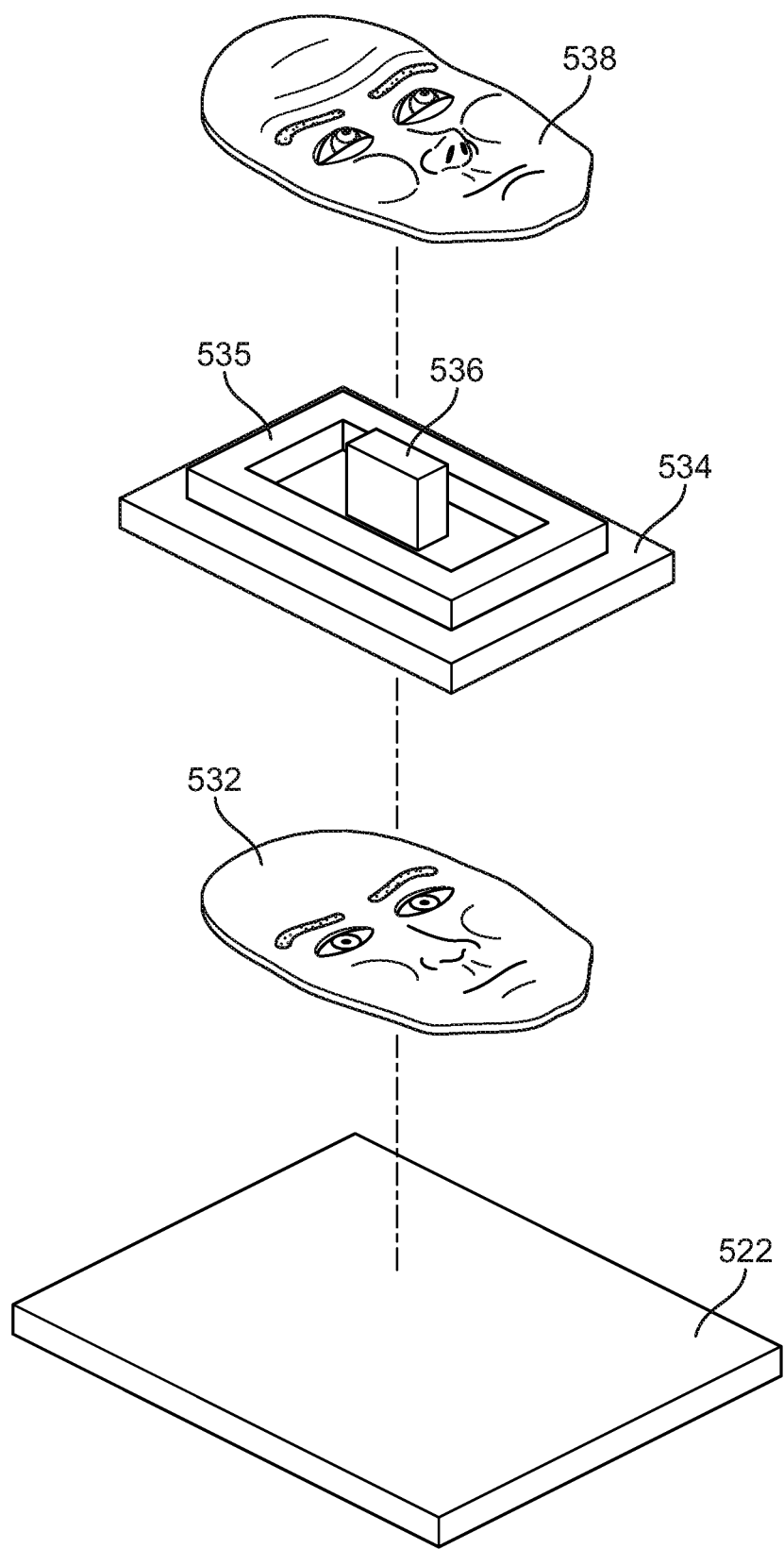
FIG. 17 shows an exploded view of the article of footwear shown in FIG. 16, showing the substrate, a first flat printed color layer, a contoured portion made of structural ink layers, and a second contoured printed color layer.

FIGS. 16 and 17 show an example of the type of three-dimensional effect that may be created when printing three-dimensional objects onto articles. FIG. 16 shows an article of footwear 520 with a three-dimensional color object 526 with a contoured surface positioned in a forefoot region of an upper 522 of article 520. Upper 522 may be associated with a sole 524. Upper 522 and sole 524 may be made of any material known in the art for use as an upper and/or a sole. In this embodiment, three-dimensional color object 526 is a face.

To give the face a three-dimensional look and feel, three-dimensional color object 526 may be printed onto upper 522 according to any method discussed above, where upper 522 is the base onto which the object is printed. FIG. 17 is an exploded view of three-dimensional color object 526 so that the arrangement and interplay of the various layers of three-dimensional color object 526.

A first color layer 532 is printed onto upper 522. First color layer 532 is a color image of the face. In this embodiment, first color layer 532 is a flat layer having uniform thickness. First color layer 532 may have the same contour as upper 522. A set of transparent structural layers are printed to form various portions of the three-dimensional object, first structural portion 534, second structural portion 535, and third structural portion 536 are printed onto first color layer 532. The set of transparent structural layers are sized and shaped to correspond to basic curvature of the face. For example, first structural portion 534 elevates the face generally; second structural portion 535 gives definition to the forehead, cheeks and lips; and third structural portion 536 provides shape to the nose. To mimic the contour of a real face, first structural portion 534, second structural portion 535, and third structural portion 536 combine to form a contoured surface. First structural portion 534 rises to a first, lowest height, above upper 522. Second structural portion 535 rises to a second height above upper 522. Third structural portion 536 rises to a third, highest height above upper 522.

A second color layer 536 is printed on top of the set of transparent structural layers to complete the image of the face. In some embodiments, second color layer 536 may be a duplicate of the color information of first color layer 532 to increase the intensity of the colors. In other embodiments, the color information used in second color layer 536 may be different from the color information of first color layer 532 so that the two color layers work together to produce a desired color effect.

Figure 18:
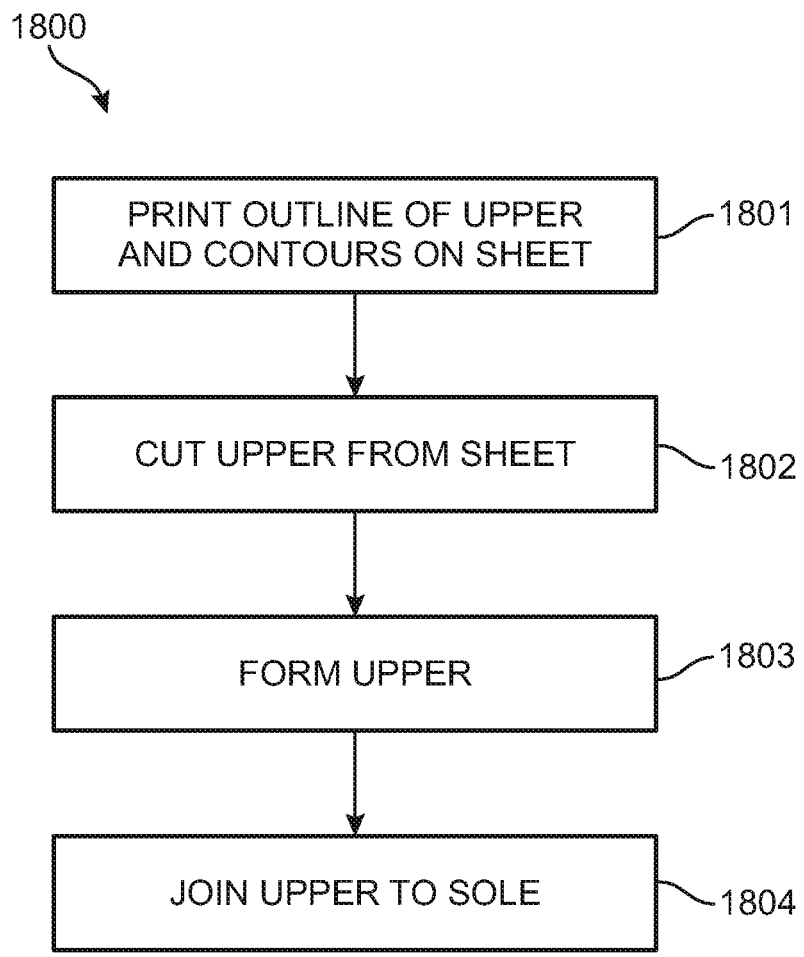
FIG. 18 shows an embodiment of a method of making an article of footwear.
Figure 19:
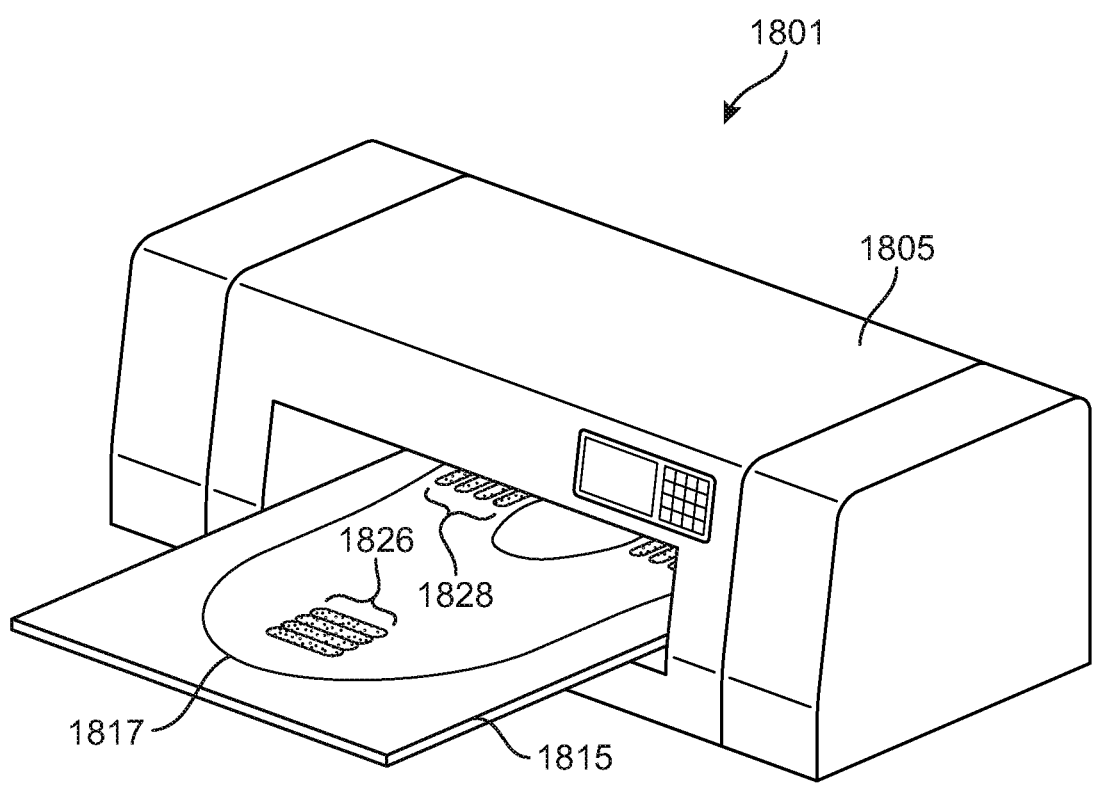
FIG. 19 shows an embodiment of a printer printing an outline of an upper and colored contours onto a sheet.
Figure 20:
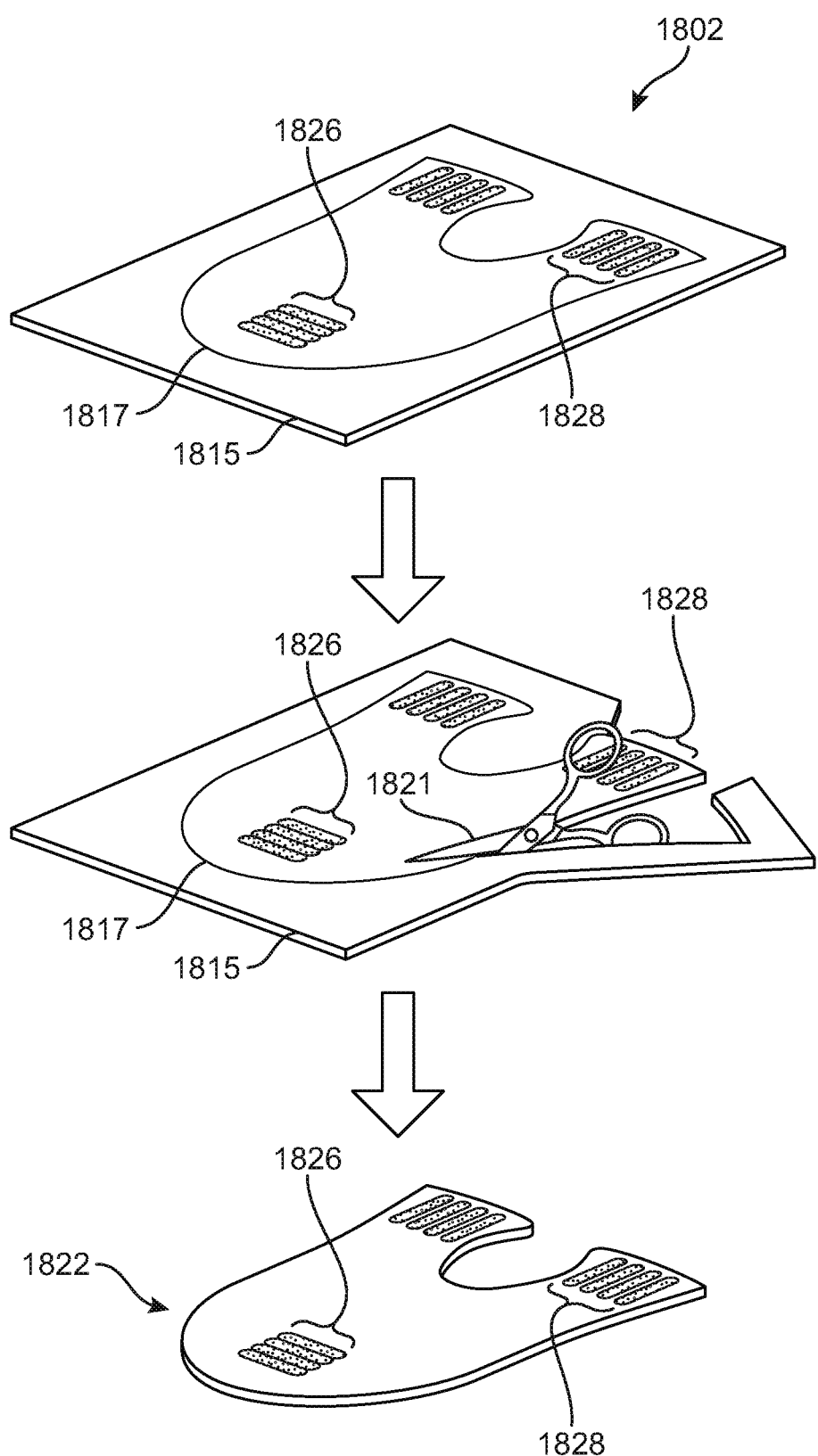
FIG. 20 shows an embodiment of a cutting tool cutting the flat shape of the upper from the sheet.

In the embodiments discussed above, a manufactured article is printed. Printing device 102 above is sized, shaped, and configured to receive manufactured articles such as shoes, articles of apparel, or sports equipment. In other embodiments, such as the embodiment shown in FIGS. 18-22, a component of the article may be printed before the article is assembled. An article of footwear is used as an example to discuss the method. FIG. 18 shows a flowchart of an embodiment of a method 1800 of manufacturing an article with a printed component. In a first method step 1801, the component is printed. FIG. 19 shows an embodiment of an implementation of first method step 1801 for an article of footwear. For an article of footwear, a sheet 1815 of upper material, such as leather, knit, and/or woven or nonwoven material is printed with a three-dimensional color object such as first contoured object 1826 and second contoured object 1828. An outline 1817 of the upper is also printed onto sheet 1815. In this embodiment, the printing device 1805 may be a flat printer, as the printing device need not be sized and shaped to receive a manufactured article. The use of sheet 1815 can simplify the printing process as the base, sheet 1815, is flat and the distance between a print head and the base is constant. Any calculations for determining where to print a particular pixel can be simplified. Additionally, the actual printing process may be simplified by restricting movement of the print head to a single plane. When printing a manufactured article, a print head may be required to move in a horizontal plane to print layers but also in a vertical plane to accommodate variations in the curvature of the article. In a second manufacturing step 1802, the printed upper pattern is cut from the sheet. FIG. 20 shows printed upper 1822 being cut from sheet 1815 using a cutting tool 1821. Cutting tool 1821 may be bladed, such as scissors, rotary cutting tools, and die cutting tools, or unbladed tools such as laser cutters and water jets, automated cutting tools, or any other cutting tool known in the art. Cutting tool 1821 follows the pattern established by outline 1817 to remove waste material from unformed printed upper 1822.

Figure 21:
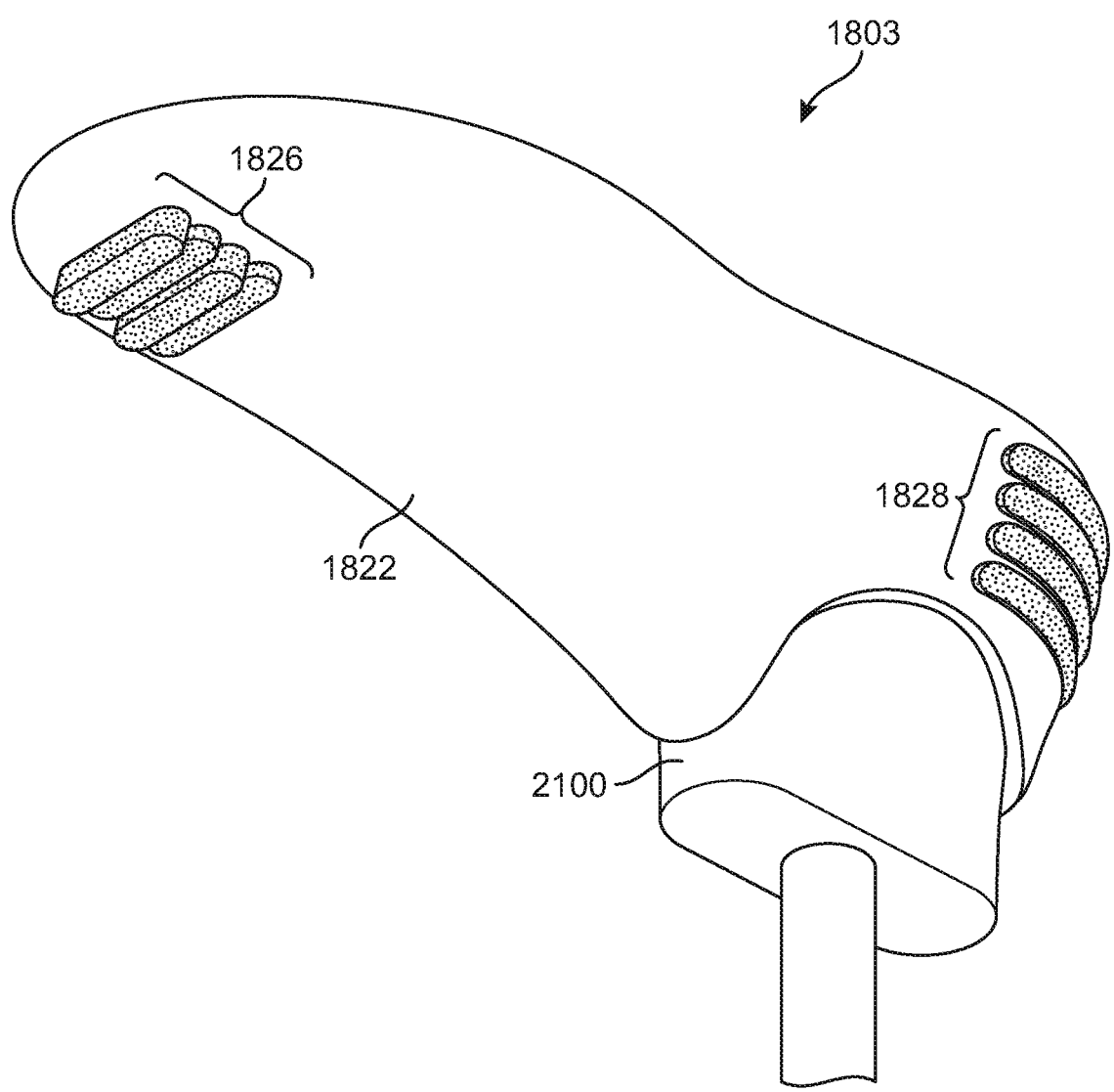
FIG. 21 shows an embodiment of a step of forming the upper on a last.
Figure 22:
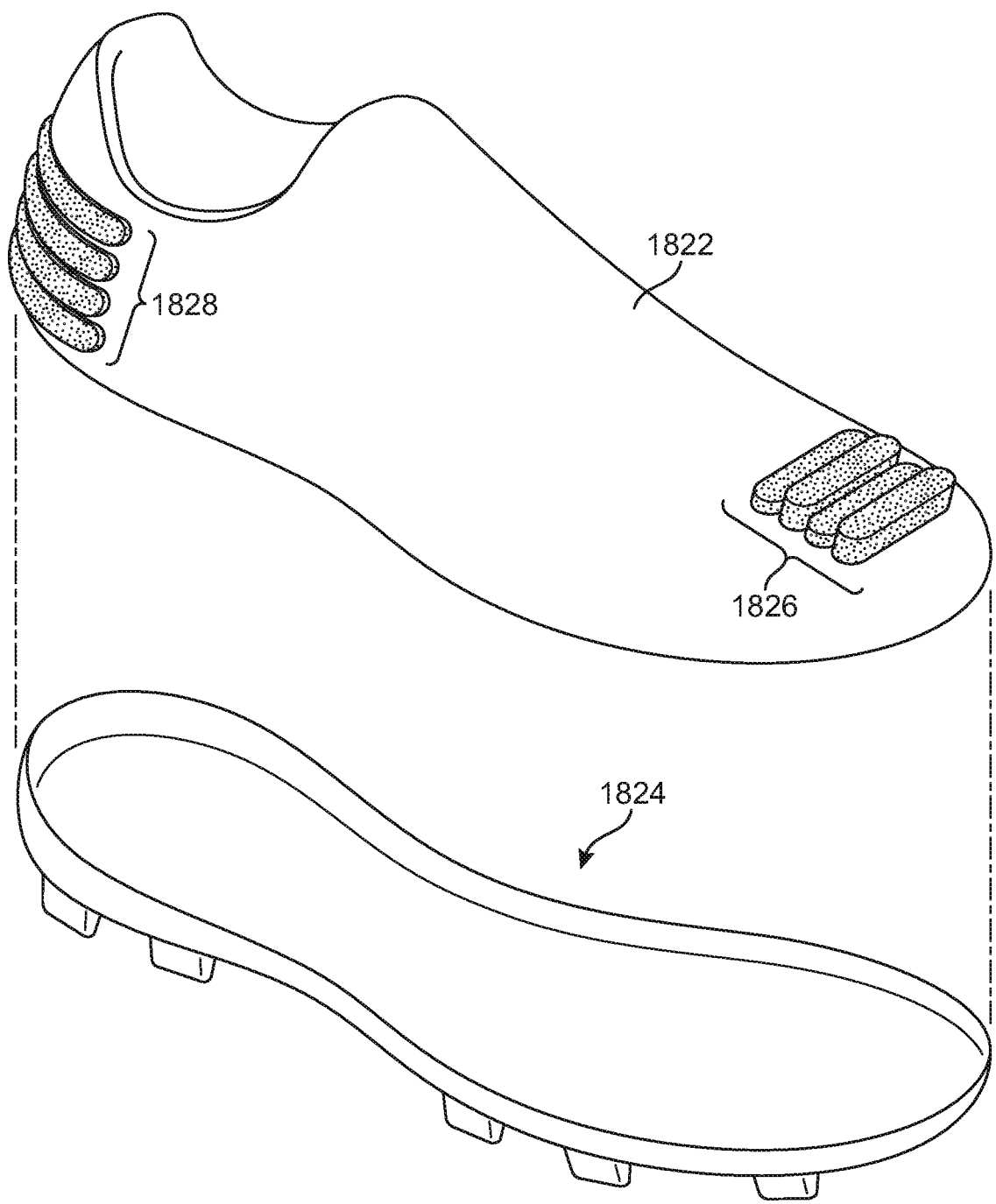
FIG. 22 shows an embodiment of a step of attaching an upper to a sole.

In a third manufacturing step 1803, printed upper 1822 is shaped and formed. FIG. 21 shows an embodiment of third manufacturing step 1803 where a last 2100 is used to shape printed upper 1822. Last 2100 may be any type of last known in the art, and printed upper 1822 may be formed on last 2100 using any method known in the art. In a fourth manufacturing step 1804, formed and printed upper 1822 is attached to a sole 1824 as shown in FIG. 22. Printed upper 1822 may be attached to sole 1824 using any method known in the art, for example, with adhesives, welding, bonding, thermal bonding, and sewing.

Figure 23:
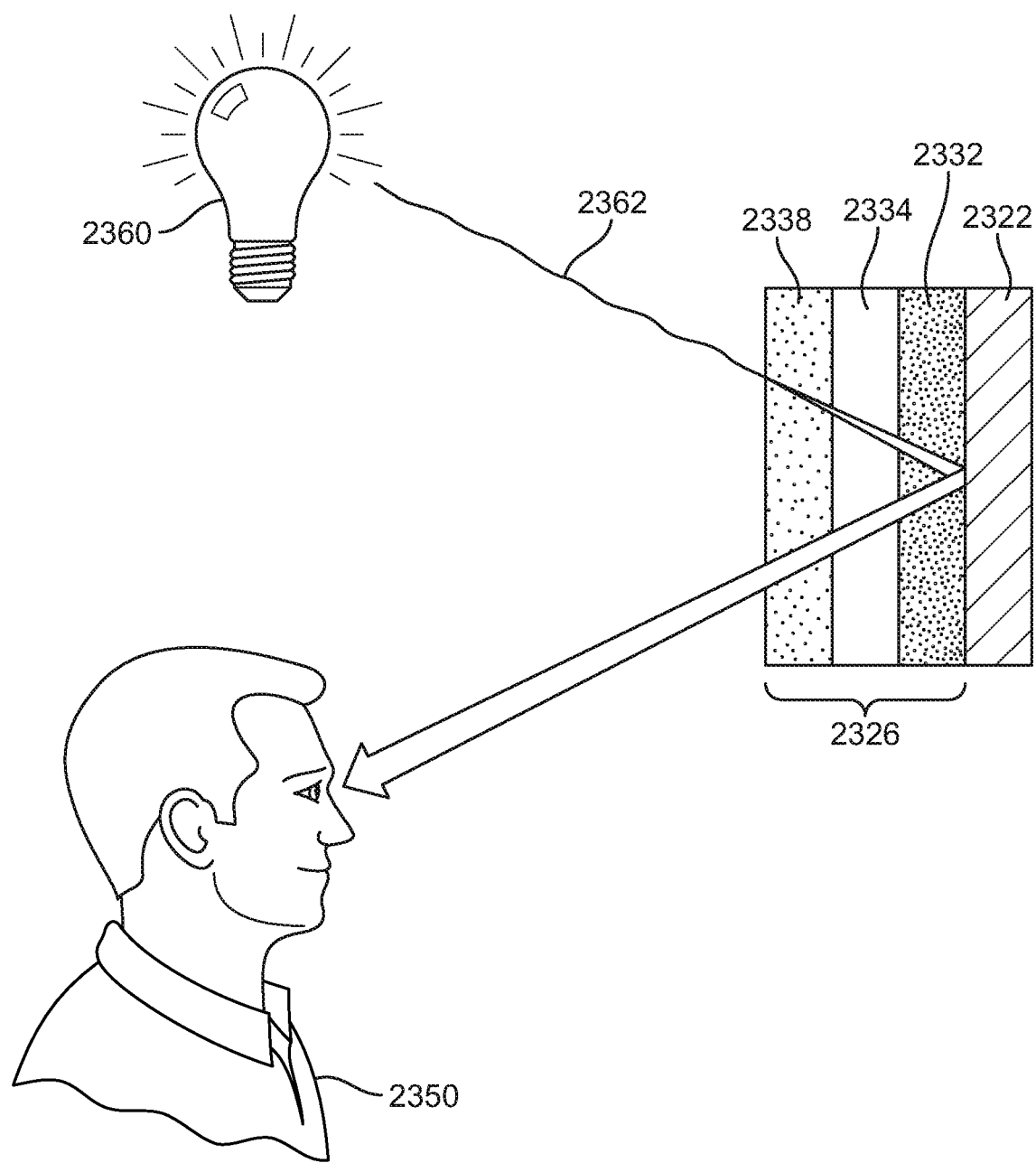
FIG. 23 shows an embodiment of how color may be perceived when viewing a multi-layer color object.

In addition to other three-dimensional effects that may result from printing color objects with contoured surfaces discussed above, the multilayer printing techniques discussed above may also permit color mixing. In some embodiments, the first color layer information received at the printing device may contain different color information received at the printing device for the second color layer so that a color perceived by a viewer of the finished printed object is different from the color printed on either layer. In other embodiments, the first color layer information received at the printing device may be the same as color information received at the printing device for the second color layer so that a color perceived by a viewer of the finished printed object is more intense than the color printed on either layer. Such color mixing using multi-layer printing is described in U.S. Patent Publication 2015-002567, what was previously incorporated herein by reference. FIG. 23 shows an embodiment of color mixing that is particularly applicable to a multi-layer object with color layers sandwiching a plurality of transparent structural layers, such as the objects shown above in FIGS. 3 and 9. In some embodiments, a desired color intensity is calculated by or input into a computer system like computer system 2 (shown in FIG. 1) as color information. To achieve that color intensity, a system need not print both color layers with that desired color intensity, as the colors of both layers will optically blend and reflect to intensify to aggregate to the desired color intensity.

For example, FIG. 23 shows a multi-layer three-dimensional color object 2326 that has been printed onto a base 2322. Base 2322 may be any type of article discussed above. Object 2326 is, in this embodiment, a three-layer object having a first color layer 2332 positioned adjacent base 2322, a transparent structural layer 2334 positioned adjacent first color layer 2332, and a second color layer 2338 positioned adjacent transparent structural layer 2334. Second color layer 2338 is a topmost or outermost layer of object 2326. These color and structural layers may be printed using any method discussed above. These color and structural layers may be made of any type of ink discussed above.

In this embodiment, second color layer 2338 is the same color as first color layer 2332, though the color of second color layer 2338 is less intense than the color of first color layer 2332. To achieve this color intensity differential, second color layer 2338 may be provided with fewer color particles in the ink than the number of color particles in the ink of first color layer 2332. In the embodiment shown in FIG. 23, second color layer 2338 has a color intensity that is 50% of the color intensity of first color layer 2332. For example, second color layer 2338 may be provided with half of the color particles that first color layer 2332 is provided.

Further the intensity of the color of first color layer 2332 may be only half of the intended object color as specified in the color information. For example, if the intended object color of object 2326 is a 100% intensity red, then first color layer 2332 may have a intensity of 50%. If second color layer 2338 has an intensity that is half of first color layer 2332, then second color layer 2338 has an intensity that is only 25% of the intended color. A viewer 2350 may perceive the intended 100% intensity due to optical mixing even though neither color layer has the 100% intended color intensity and the printed intensity is less than 100% saturation.

When a viewer 2350 looks at object 2326, viewer 2350 is perceiving light reflected off of object 2326. A light source 2360, such as the sun or an artificial light source, produces an incident light ray 2362 that travels towards object 2326 and reflects to viewer 2350. Incident light ray 2362 enters object 2326 through second color layer 2338. Second color layer 2338 has 25% color intensity. Incident light ray 2362 carries a portion of the color intensity of second color layer 2338 further into object 2326. In some embodiments, the portion of carried color intensity may be about 12.5% or half of the color intensity of second color layer 2338. Light ray 2362 passes through transparent layer 2334 and into first color layer 2332. First color layer 2332 has 50% color intensity. Light ray 2362 carries a portion of the color intensity of first color layer and the previously-acquired portion of the color intensity of second color layer 2338 to base 2322. In some embodiments, the carried portion of the color intensity of first color layer 2332 is about 25% or half of the color intensity of first color layer. Light ray 2362 is reflected off of base 2322 towards viewer 2350. As light ray 2362 passes back through first color layer 2332 and second color layer 2338, additional viewable color is added to the reflected light ray 2362: the 50% color intensity of first color layer 2332 and the 25% color intensity of second color layer 2338. The aggregate color intensity of the carried and reflected color intensity of reflected light ray 2362 when light ray 2362 reaches viewer 2350 is greater than the color intensity of either first color layer 2332 or second color layer 2338. In some embodiments, the aggregate color intensity is the intended 100% color intensity.

This type of aggregated and reflected color mixing may provide cost savings because fewer color particles may be used in printing a multilayer object than if a single layer object with the same viewable color is printed. Additionally, this type of color mixing may yield pleasant aesthetic effects, as the viewable color may appear to have more depth than a viewable color of a single layer color object.

Other visual effects are also possible using a color-layered structure such as is shown in FIG. 23. For example, object 2326 may appear differently when viewed from different angles. In some embodiments, the color of first color layer 2332 may be different from second color layer 2338. When viewed head-on, a viewer may perceive a composite color of first color layer 2332 and second color layer 2338, as described above. In such an embodiment, the color of first color layer 2332 may be hidden or obscured by the composite color of first color layer 2332 and second color layer 2338. However, when viewed from a different angle, such as from the side, the aesthetic appearance of object 2326 may be different. When viewed from the side, the thickness of first color layer 2332 may be perceived, and, accordingly, the color of first color layer 2332 may be seen, giving object 2326 a different appearance. Object 2326 may be printed using any of the techniques and methods disclosed above, where the color of first color layer 2332 may be viewed from certain, selected angles, such as from the side, such as by printing object 2326 so that the thickness of first color layer 2332 is sufficient to be visible.

In another embodiment, second color layer 2338 may be opaque. When viewed head-on or from certain angles, a viewer may perceive only second color layer 2338 while the color of first color layer 2332 is obscured by the opaque second color layer 2338. When viewed from other angles, such as from the side, the thickness of first color layer 2332 may become visible. Because first color layer 2332 has, in some embodiments, uniform color through the thickness, the color of first color layer 2332 is no longer obscured by the opaque second color layer 2338. Object 2326 may be printed using any of the techniques and methods disclosed above, where the color of first color layer 2332 may be viewed from certain, selected angles, such as from the side, such as by printing object 2326 so that the thickness of first color layer 2332 is sufficient to be visible.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

The invention claimed is:

1. A method of printing a three-dimensional object onto a base using a printing system, the method comprising:
   receiving at the printing system:
     a first target thickness for a first region of the three-dimensional object;
     a predefined first structural layer thickness for a printed layer; and
     color layer information for each of a first color layer and a second color layer;
   receiving the base at the printing system;
   calculating a number of first structural layers to be printed to achieve the first target thickness for the first region based on the predefined first structural layer thickness;
   printing the first color layer onto the base using the received color layer information for the first color layer;
   printing a first set of structural layers onto the first color layer, a number of layers in the first set of structural layers in the first region being equal to the calculated number of first structural layers and each layer in the first set of structural layers having the predefined first structural layer thickness; and printing the second color layer onto the first set of structural layers using the received color layer information for the second color layer;

wherein a second set of structural layers in a second region that is adjacent to the first region is printed onto the first color layer adjacent the first set of structural layers to achieve a second target thickness that is different than the first target thickness while having the same number of layers as the first set of structural layers;

the method further comprising receiving the second target thickness for the second region at the printing system, printing the second set of structural layers onto the first color layer in the second region to achieve the second target thickness for the second region, and printing the second color layer onto the second set of structural layers using the received color layer information for the second color layer;

wherein the first and second sets of structural layers in the first and second regions are arranged to collectively form an upper surface having a surface contour; and wherein the first and second sets of structural layers and the second color layer are at least partially transparent, such that light reflected from the first color layer passing through the first and second sets of structural layers and through the second color layer creates a three-dimensional visual effect that is based at least in part on the first and second target thicknesses.

2. The method of claim 1, further comprising printing one or more transparent layers onto the second color layer.

3. The method of claim 2, wherein each layer of the one or more transparent layers has a thickness that is equal to the predefined first structural layer thickness.

4. The method of claim 1, wherein the first color layer is printed so that a thickness of the first color layer may be visible at certain viewing angles.

5. A method of printing a three-dimensional object onto a base using a printing system, the method comprising:
  receiving at the printing system:
    a first target thickness for a first region of the three-dimensional object;
    a predefined number of structural layers to be printed; and
    color layer information for each of a first color layer and a second color layer;
  receiving the base at the printing system;
  calculating a structural layer thickness for a printed layer to be printed to achieve a target thickness for the first region using the first target thickness and the predefined number of structural layers;
  printing the first color layer onto the base using the received color layer information for the first color layer;
  printing a first set of structural layers onto the first color layer, a number of layers in the first set of structural layers being equal to the predefined number of structural layers and each layer in the first set of structural layers in the first region having the calculated structural layer thickness; and
  printing the second color layer onto the first set of structural layers using the received color layer information for the second color layer;
  wherein a second set of structural layers in a second region that is adjacent to the first region is printed onto the first color layer to achieve a second target thickness that is different than the first target thickness;

the method further comprising receiving the second target thickness for the second region at the printing system, printing the second set of structural layers in the second region to achieve the second target thickness for the second region, and printing the second color layer onto the second set of structure layers;

wherein a number of layers in the second set of structural layers is also equal to the predefined number of structural layers;

wherein the sets of structural layers in the first region and the second region are arranged to collectively form an upper surface having a surface contour; and wherein the first and second sets of structural layers and the second color layer are at least partially transparent, such that light reflected from the first color layer passing through the first and second sets of structural layers and through the second color layer creates a three-dimensional visual effect that is based at least in part on the first and second target thicknesses.

6. The method of claim 5, wherein a combination of the first color layer, the first set of structural layers, and the second color layer has a thickness that is equal to the first target thickness.

7. The method of claim 5, further comprising printing one or more transparent layers onto the second color layer.

8. The method of claim 7, wherein a combination of the first color layer, the first set of structural layers, the second color layer, and the one or more transparent layers has a thickness that is equal to the first target thickness.

9. The method of claim 7, wherein a combination of the one or more transparent layers is printed having a thickness that is less than a combined thickness of the first set of structural layers.

10. The method of claim 5, wherein the first color layer is printed so that a thickness of the first color layer may be visible at certain viewing angles.

11. A method of printing a three-dimensional object onto a base using a printing system, the method comprising:
  receiving at the printing system:
    a first target thickness for a first region of the object;
    a second target thickness for a second region of the object; and
    color layer information;
  receiving the base at the printing system;
  printing a first color layer onto the base using the color layer information;
  printing first and second sets of structural layers onto the first color layer, the first set of structural layers in the first region being printed to achieve the first target thickness for the first region and the second set of structural layers in the second region being printed to achieve the second target thickness for the second region that is different than the first target thickness for the first region while having the same number of layers as the first set of structural layers;
  printing a second color layer onto the first and second sets of structural layers using the color layer information; and
  printing a transparent layer onto the second color layer;
  wherein the first region is adjacent to the second region so that the first and second sets of structural layers in the first and second regions are arranged to collectively form an upper surface having a surface contour; and
  wherein the first and second sets of structural layers and the second color layer are at least partially transparent, such that light reflected from the first color layer passing through the first and second sets of structural layers, through the second color layer, and through the transparent layer, creates a three-dimensional visual effect that is based at least in part on the first and second target thicknesses.

12. The method of claim 11, wherein the surface contour is a target surface contour corresponding to the first target thickness for the first region and the second target thickness for the second region.

13. The method of claim 12, wherein the second color layer has a surface contour identical to the target surface contour.

14. The method of claim 12, wherein the transparent layer has a surface contour identical to the target surface contour.

15. The method of claim 12, wherein the first color layer has a surface contour different from the target surface contour.

16. The method of claim 12, wherein the base has a surface contour different from the target surface contour.

17. The method of claim 11, wherein the base has a base color that is different from a first color layer color and a second color layer color, and wherein the object is printed onto the base so that the base color is visible when the object is viewed from certain viewing angles.

18. The method of claim 1, wherein the first and second sets of structural layers are transparent.

19. The method of claim 5, wherein the first and second sets of structural layers are transparent.

20. The method of claim 11, wherein the first and second sets of structural layers are transparent.

* * * * *